United States Patent [19]

Matsuzaki et al.

[11] Patent Number: 5,199,070
[45] Date of Patent: Mar. 30, 1993

[54] METHOD FOR GENERATING A PUBLIC KEY

[75] Inventors: Natsume Matsuzaki, Minoo; Shunji Harada; Makoto Tatebayashi, both of Osaka, all of Japan

[73] Assignee: Matsushita Electric Industrial Co., Ltd., Osaka, Japan

[21] Appl. No.: 809,134

[22] Filed: Dec. 18, 1991

[30] Foreign Application Priority Data

Dec. 18, 1990 [JP] Japan .................................. 2-403058
Aug. 8, 1991 [JP] Japan .................................. 3-199148
Sep. 6, 1991 [JP] Japan .................................. 3-227125

[51] Int. Cl.$^5$ .......................................... H04L 9/30
[52] U.S. Cl. ........................................... 380/30
[58] Field of Search ................................. 380/30

[56] References Cited

U.S. PATENT DOCUMENTS 4,956,863  9/1990  Goss ...................................... 380/30
4,995,082  2/1991  Schnorr ............................... 380/30
5,029,208  7/1991  Tanaka ............................. 380/30 X
5,073,935  12/1991  Pastor ................................. 380/30

OTHER PUBLICATIONS

Tsai et al., "ID-Based Public Key Crytosystems Based on Okamoto and Tanaka's ID-Based One Way Communication Scheme," Electronics Letters, 10th May 1990, vol. 26, No. 10, pp. 666-668.

Primary Examiner—Gilberto Barrón, Jr.
Attorney, Agent, or Firm—Wenderoth, Lind & Ponack

[57] ABSTRACT

A authentic public key of the other party of user in communications is generated using the other party's user information and identification information, and a center's public information. The center doesn't know the user's secret keys, and no secret communication paths are required between the center and the users. The workload of the users is not increased even if a plurality of centers are introduced to prevent possible wrongdoing by the center.

50 Claims, 11 Drawing Sheets

METHOD FOR GENERATING A PUBLIC KEY

BACKGROUND OF THE INVENTION

1. Field of the Invention

The present invention relates to a method for generating an authentic public key of another party of communications.

2. Description of the Prior Art

One of currently available cryptographic techniques which are used to keep data secret, authenticate the other party of communications and make signatures is the public key crypto system. The public key crypto system is best suited to a large scale network having a large number of users, because it involves a small number of sorts of keys to be kept secret. The public key crypto system requires a technique that ensures the completeness of the public key, that is, a technique which assures that data used as the public key of another user party is unmistakably the public key of the other user party.

A first method to ensure the completeness of the public key is provided by a method in which all users, public keys are stored into a public list and managed by a reliable center. In this case, each user can access the public list to see its contents, but only the reliable center that manages the public list can write thereinto. Each user registers its own public key on the public list through the center, and acquires the public key of another user party by referring to the list. However, when this method is applied to a network having a large number of users, many accesses by users concentrate on the public list, burdening the center disadvantageously. Besides, the public key crypto system mentioned herein makes an assumption that the organization managing the public directories is reliable.

A second method to ensure the completeness of the public key is provided by a method in which each user manages its own public key and exchanges its public key with the other party for encrypted communications or authentication of the other party. This method eliminates the need for the public list, thereby dispersing the workload among users. However, the method in turn necessitates a means to ensure that the public key received by one user from the other is the authentic one (assurance of the completeness of the public key). One method to realize this assurance is utilizing a public key identification certificate issued to each user's public key by a reliable organization or center. The public key identification certificate mentioned herein means the signature information, generated by the center on which all users rely, corresponding to each user's identification information ID and public key. Typically, the ID can be any widely known information such as a user's name and address. This method is described below under prior art example 1.

Prior art example 1

FIG. 9 is a chart showing the prior art example described above. Specifically illustrated here is how a center issues a public key identification certificate, based on the ElGamal signature scheme. Element 1 is a user i. Element 2 is a center and element 3 is a user j. Although the ElGamal signature scheme is employed in the example here, any other scheme may be employed to provide a similar construction. The ElGamal signature scheme, a signature scheme based on the difficulty of discrete logarithm problems, is fully discussed in "A Public Key Crypto System and Signature Scheme Based On Discrete Logarithm" (IEEE Trans.on IT, 1985) by T. E. ElGamal. Referring to FIG. 9, the prior art example is described below, organizing the entire procedure into three steps: 1) system setup step carried out by the center 2 for system construction, 2) public key identification certificate issuing step required for a user to subscribe to the system, and 3) public key identification certificate verification step, i.e. public key authenticity verification step carried out to acquire authentic public keys among users.

1) System setup step (1) The center sets a large prime number q and a primitive root g of the residue-class field with q as a modulus.

(2) The center sets a secret key S, and determines the public key P corresponding to the secret key S according to the equation below:

$$P = g^S \bmod q \qquad [1]$$

(3) The center notifies each user of (q, g, P).

Note that (mod q) represents an equation in which the residue is determined by dividing by q. Given S, q and g in equation [1], P is easily calculated. If P, q, and g are known, however, determining S becomes more and more difficult as q increases. S is called a discrete logarithm of P wherein q is its modulus and g is its base. Determining S is well known as the discrete logarithm problem.

2) Public key identification certificate issuing step

Described below is a procedure of how an arbitrary user i subscribes to the system.

(1) A user i sets up a secret key xi, and determines its public key yi according to the following equation:

$$y_i = g^{x_i} \bmod q \qquad [2]$$

(Any variable associated with a suffix i means that it is the one for a user i)

(2) The user i notifies the center of its public key yi and its identification information IDi to request the issue of the public key identification certificate with respect to (yi, IDi).

(3) The center verifies that the user who requests the issue of the public key identification certificate is the authentic user i. The explanation of this verification step is skipped, because it is outside the coverage of the present invention.

(4) The center prepares a secret random number ri for each user, one different from user to user. The center determines the public key identification certificate (ti, si) with respect to (yi, IDi) by means of the center's secret key S using the following equations:

$$t_i = g^{r_i} \bmod q \qquad [3]$$

$$s_i = (y_i \,||\, ID_i - S \times t_i)/r_i \bmod (q-1) \qquad [4]$$

where $||\phi$ denotes a concatenation.

(5) The center issues the public key identification certificate (ti, si) to the user i.

3) Public key identification certificate verification step

Described below is a step of how the arbitrary user j gets the authentic public key from the arbitrary user i. Conversely, this step is applied also when the user i gets the authentic public key of the user j. Thus, with each other's authentic public key obtained by both of i and j, it is possible to perform encrypted communications and authentication communications using the public key crypto system therebetween.

(1) The user i notifies the user j of its public key yi and identification information IDi and its public key identification certificate (ti, si) which has been issued by the center in step 2).

(2) The user j checks if the following equation holds good, using public key yi, identification information IDi, and public key identification certificate (ti, si) notified of by the user i:

$$g^{yi}\ IDI = P^{ti} \times ti^{si} \bmod q \qquad [5]$$

The user j receives the public key yi as the authentic public key of user i if equation [5] holds good. If not, the user j discards yi. It should be noted that a set of variables (q, g, P) has been provided by the center in step 1).

This method of verifying the public key identification certificate mentioned above frees each user from accessing the center to get the public key of the other user.

Listed below are traffic from the user i to the user j and the amount of calculation conducted in the calculation process on both users, in the public key identification certificate verification step of the prior art example 1 mentioned above:

Traffic: Approx. $4 \times \log_2 q$ bits (assume that yi, IDi, ti, si $< q$)

Process Amount: Amount: Approx. $1.875 \times \log_2 q$ times of residue of the multiplication calculation process per $\log_2 q$ bit width on average The above method of using the public key identification certificate issued by the center is known for the need to set, for example, 512 or so for $\log_2 q$, in order to assure sufficient security of the secret key xi (thus, in order to present sufficient difficulty in solving the discrete logarithm problem). Substituting 512 for $\log_2 q$ results in a traffic of 2048 bits. The overall calculation process amount both on the user i and user j is thus average approx. 960 times of residue of the multiplication calculation process per 512 bit width.

There is another available method which, like the prior art example 1, eliminates the need of the public list and yet allows each user to get the authentic public key from the other user. I call it is a public key generation method. In the other use's public key generation method, each user generates the public key according to the information transmitted by him and the public information of the system. The generated public key of the other user is used, without confirming its authenticity on the spot, to make encryted communications or authentication communication with him. The public key generation method features as follows:

(a) Based on user identification information, a center generates and issues, in advance, the user information to the user. Since the user information has been generated by means of the center's secret key, no user can forge it. The user transmits data to the terminal of the other user, after preparing data according to the user information.

(b) Whether the public key generated by means of data transmitted by the user is authentic or not can be determined later when the public key is used.

The above statement that the user information cannot be forged means that a forger has a difficulty in producing the user information which is required to generate the public key corresponding to the secret key selected by the forger. Even if an attempt is made to use an unauthentic public key, generated from the user information which has been somehow forged, the security of the secret key xi is not endangered because the forger (if more precisely termed, nobody) has no corresponding secret key. This method allows the authenticity of the public key to be indirectly verified. In other words, the authenticity of the public key does not need to be verified in such a direct manner as in the prior art example 1.

Prior art example 2

One of the known public key generation methods is the one proposed in Japanese Laid-Open Patent Publication No. 314586/1988.

The procedure of this method is illustrated in FIG. 10. Referring to FIG. 10, the procedure of this method is described below as prior art example 2. Element 1 is a user i Element 2 is a center and element 3 is a user j.

1) System setup step (1) The center sets up large secret prime numbers p and q, and determines the product n of both numbers. The center also determines a primitive root g which is common to both one residue-class field provided by modulus p and another residue-class field provided by modulus q.

(2) The center sets up a secret key d, and determines e so that e satisfies the equation: $e \times d = 1 \bmod L$, where L is LCM $(p-1, q-1)$, that is, the least common multiple of $(p-1)$ and $(q-1)$. Alternatively, e may be first set up in the above equation.

(3) The center keeps (d, p, q) in secret as the center's secret information, while it notifies each user of (n, e, g).

In order to determine d from public e, we must factorize n into prime factors, p and q, and the larger n, is the more difficult the factorization of n becomes. If, for example, 512 is set for n, the determination of the secret d from the public e is practically impossible.

2) User information issuing step (1) The user i requests the center to issue the user information, notifying it of its own identification information IDi.

(2) The center verifies that the user who requests the issue of user information is authentically the user i.

(3) Using the secret key d, the center generates the user information:

$$si = IDi^{-d} \bmod n \qquad [6]$$

(4) The center delivers the user information si to the user i via a secret communications path.

(5) The user i keeps in secret the user information delivered by the center.

3) Public key generation step

Described below is the procedure where the arbitrary user j generates the public key of the arbitrary user i.

(1) The user i generates random number ri, and then generates transmit data xi below:

$$xi = si \times g^{ri} \bmod n \qquad [7]$$

(2) The user i determines the product of the above random number and the public value e, and keeps the result as the secret key.

(3) The user i sends the transmit data xi along with its identification information IDi to the user j.

(4) Receiving the transmit data xi and the identification information IDi of the user i, the user j performs the following calculation:

$$yi = xi^e \times IDi \bmod n \qquad [8]$$

Where, $yi = (si \times g^{ri} \bmod n)^e \times IDi \bmod n$ (from equation [7])
$= IDi^{-1} \times IDi \times g^{e \cdot ri} \bmod n = g^{e \cdot ri} \bmod n$ (from equation [6] and $e \times d = 1 \bmod L$)

This yi can be considered as the public key corresponding to the secret key $e \times ri$ of the user i in the crypto system based on the discrete logarithm.

Compared with the public key identification certificate method as prior art example 1, the public key generation method as prior art example 2 suffers the following shortcomings:

(a) Since the center generates user's secret information (user information si), the center's authority becomes dominant. The center thus must be perfectly reliable.

(b) For the center to deliver the user information to the user in (4), step 2), a secret communications path is required between the center and the user. This requires in turn, for example, an IC card to be used as the medium for delivery.

When the public key is generated in the public key generation method in the prior art example 2, traffic between the user i and the user j, and the amount of calculation conducted in the calculation process on both users, in the public key generation step are listed below. In this case, since the public key e of the center can be decreased down to 3 with its security still maintained, the number of iteration of residue of the multiplication calculation process in power operation using e as exponent is several times (herein $\alpha$ times).

Traffic: $2 \times \log_e n$ bits (where $Xi, IDi < n$)

Process Amount: $(1.5 \times \log_2 n + \alpha)$ times of residue of the multiplication calculation process per $\log_2 n$ bit width on average The above method is known for the need to set, at least, 512 bits or so for $\log_2 n$, in order to ensure sufficient security, that is, in order to present sufficient difficulty in solving the factoring problem. Substituting 512 for $\log_2 n$ results in a traffic of 1024 bits and an overall amount of 768 times of residue of the multiplication calculation process per 512 bit width on average.

By the way, in the prior art examples 1 and 2 shown above, the center can easily commit wrongdoing, as described below, if it so intends. In the prior art example 1, the center sets up for the user i a false secret key and public key (xi', yi'), and the center by itself then issues this public key identification certificate (ti', si') with respect to this yi, and the identification information IDi for the user i. The center then can disguise itself as the user i by notifying a third user of (yi', IDi, ti', si'). In the prior art example 2, the center knows the secret user information of the arbitrary user i. Thus, using the user information, the center can produce transmit data xi', and notifies a third user of (xi', IDi) so that it can disguise itself as the user i.

Against this, there may be another method in which a plurality of centers are established so that wrongdoing cannot be committed unless all the centers cooperate together. Described below is a prior art 3, for example, where a plurality of centers are provided in the prior art example 1. For simplicity of description, only two centers are employed here. The signature scheme which the centers use to issue the public key identification certificate is the ElGamal signature scheme as in the prior art example 1.

Prior art example 3

FIG. 11 shows the construction of the prior art example 3. Referring to FIG. 11, the procedural steps are described below. A first center (hereinafter, center 1) is indicated at 11. A second center (hereinafter, center 2) is indicated at 12. A user i and a user j are indicated at 13 and 14, respectively.

1) System setup step (1) Both centers 1 and 2, in cooperation, set up a large prime number q and a primitive root g of the residue-class field with q as modulus.

(2) The centers 1 and 2 independently produce secret keys S1 and S2, respectively, and keep them in secret to each other. The centers 1 and 2 determine public keys P1 and P2, respectively, by the following equations:

(Center 1)

$$P1 = g^{a1} \bmod q \qquad [9]$$

(Center 2)

$$P2 = g^{a2} \bmod q$$

(3) The centers 1 and 2 notify each user of (q, g, P1, P2).

2) Public key identification certificate issuing step (1) The user i sets up a secrete key xi, and determines the public key yi with respect to it, according to the following equation:

$$yi = g^{xi} \bmod q \qquad [10]$$

(2) the user i notifies both the center 1 and the center 2 of the public key yi and the identification information IDi of the user i, and requests both centers to issue the public key identification certificates with respect to (yi, IDi).

(3) Each center verifies that the user who requests the issue of the public key identification certificates is the authentic user i. The explanation of this verification step is skipped.

(4) The centers 1 and 2 independently generate random number ri 1, ri 2, and then determine public key identification certificates (ti1, si1) and (ti2, si2), respectively, according to the following equation, where symbol ¦¦ denotes a concatenation.

(Center 1)

$$ti1 = g^{ri1} \bmod q \qquad [11]$$

$$si1 = (yi \,\|\, IDi - S1 \times ti1)/ri1 \bmod (q-1)$$

(Center 2)

$$ti2 = g^{ri2} \bmod q$$

$$si2 = (yi \,\|\, IDi - S2 \times ti2)/ri2 \bmod (q-1)$$

(5) The centers 1 and 2 issue the public key identification certificates (ti1, si1) and (ti2, si2), respectively, to the user i.

3) Public key authenticity verification step (1) The user i notifies the user j of the public key yi, the identification information IDi and the public key identification certificates (ti1, si1) and (ti2, si2).

(2) The user j checks to see if both equations below hold good with respect to the public key yi, identification information IDi, and public key identification certificates (ti1, si1) and (ti2, si2) notified of by the user i:

$$g^{ri \mid\mid IDi} = P1^{ti1} \times ti1^{si1} \bmod q \quad [12]$$

$$g^{yi \mid\mid IDi} = P2^{ti2} \times ti2^{si2} \bmod q$$

The user j receives yi as the authentic public key of the user i if both equations [12] hold good. If either of both equations [12] fails to hold good, the user j discards the public key yi. It should be noted that a set of variables (q, g, P1, P2) is the information publicly provided by each center.

With no knowledge of the secret keys of the centers, each user can hardly generate the public key identification certificates (ti1, si1) and (ti2, si2) that satisfy equations [12]. Unlike the prior art examples 1 and 2, one center alone is unable to commit wrongdoing even if it so intends, in this method. For example, if center 1 intends to disguise itself as the user i, since the center 1 has no knowledge of the secret key S2 of the center 2, it cannot forge the public key identification certificate (ti2, si2) to be issued by the center 2, and the second one of the equations [12] fails to hold, and the wrongdoing can be detected at the user j side. In other words, to make false public key identification certificates for any wrongdoing, both centers need to cooperate. Whereas the number of centers has been assumed here to be two to simplify the description, establishing more centers will make it practically impossible for an individual center to commit wrongdoing.

In the above-described step of the prior art example 3 for verifying the public key identification certificate, traffic between users and the amount of calculation conducted in the calculation process on users are listed below in the case that the number of centers is N.

Traffic: $(2N+2) \times \log_2 q$ bits

Process Amount: Approx. $1.875 \times N \times \log_2 q$ times of residue of the multiplication calculation process per $\log_2 q$ bit width on average Substituting 512 for $\log_2 q$, as in the prior art example 1, results in a traffic of $(2N+2) \times 512$ bits. The overall calculation amount processed by users is thus $N \times 960$ times or so of residue of the multiplication calculation process per 512 bit width on average. Consequently, in the prior art example 3, if the number of centers N is increased to reinforce the security against the wrongdoing which is possible if all the centers cooperate, traffic and calculation amount of the users will also increase proportionately.

Although the prior art example 3 described above has such a construction that the prior art example 1 is extended to involve a plurality of centers, the prior art example 2 may also be extended to a version which has a plurality of centers. In this case, also as in the prior art example 3, if the number of centers are increased to reinforce the security, traffic and calculation amount of the users will increase proportionately.

As already described, compared with the public key identification certificate method in the prior art example 1, the public key generation method in the prior art example 2 suffers the following two shortcomings: First, since the center generates the user's secret key, the center should be completely reliable. Second, for the center to deliver user information to a user, a secret communications path such as an IC card needs to be used as the medium for delivery between the center and the user.

By establishing a plurality of centers, the prior art example 1 (and the prior art example 2, as well) can be extended to a construction which helps avoid wrongdoing by any center, as exemplified by the prior art example 3. Establishing a plurality of centers makes it impossible for each center alone to commit wrongdoing, except for cooperation of all the centers for the wrongdoing. In the prior art example 3 or an extended version of the prior art 2, increasing the number of centers to reinforce the security in case that all centers may cooperate increases proportionately traffic and process amount of calculation of the users.

SUMMARY OF THE INVENTION

The present invention has been developed with a view to substantially solving the above described disadvantages in the prior art examples and has for its essential object to provide an improved public key generation method which features in that:

(1) The secret key of a user is kept unknown to a center.

(2) No secret communication paths are required between the center and the user.

(3) When a plurality of centers are established not to allow any center to commit wrongdoing, the traffic and the process amount of calculation for a user to obtain the public key are not increased in proportion to the number of centers.

The object (1) and (2) overcome the disadvantages which the public key generation method in the prior art example 2 has had as compared with the public key identification certificate method in the prior art example 1. The object (3) overcomes the disadvantage the prior art example 3 bears.

In order to achieve the aforementioned object, according to the present invention, there is provided a public key generation method having a first user bearing unique identification information, a second user bearing unique identification information, a user information issuing center, and a network which interconnects these, wherein the user information issuing center sets up both a public one-way function f and a public function h, the one-way function f being such a function that an output value of the public one-way function f taking an input of the result of a first operation taking inputs of both a first data and a second data is equal to the result of a second operation taking inputs of both the output value of the one-way function f, which taking an input of the first data, and the second data, and that the output value of the one-way function f taking an input of the result of a third operation taking inputs of both the first data and the second data is equal to the result of a fourth operation taking inputs of both the output value of the one-way function f taking an input of the first data and the output value of the one-way function f taking an input of the second data, the public key generation method comprising:

a system setup step, wherein the user information issuing center sets up a secret key S, keeps it in secret, calculates, as the public key of the user information issuing center, an output value P of the one-way function f taking an input of the secret key S of the user information issuing center, and notifies the first and the second users of the public one-way function f, the public function h and the public key P as public information of the user information issuing center;

a user information issuing step, wherein the first user sets up a secret key, determines, as the public key of the first user, the output value of the one-way function f taking an input of the secret key, notifies the user information issuing center of the public key and the identification information of the first user, and requests the user information of the first user; and wherein the user information issuing center authenticates the first user, generates a random number r, keeps it in secret, determines the result u of the fourth operation taking inputs of both the output value of the one-way function f, which takes an input of the random number r, and the public key of the first user, inputs the result u and the identification information of the first user into the public function h, calculates the result of the first operation taking inputs of both the secret key S of the user information issuing center and the output value of the function h, calculates the result v of the third operation taking inputs of both the result of the first operation and the random number r, and issues, to the first user, the results u and v as the first user information and the second user information, respectively, of the first user; and a public key generation step, wherein the first user sends to the second user the first user information u, the second user information v, and the identification information of the first user; the second user inputs the first user information u and the identification information of the first user into the public function h, calculates the result of the second operation taking inputs of both the public key P of the user information issuing center and the output of the function h; taken as the public key of the first user is the result of the fourth operation taking inputs of both the result of the fourth operation, which takes inputs of both the result of the second operation and the user information u, and the inverse number of the output value of the one-way function f taking an input of the second user information v in the fourth operation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiment 1

Figure 1:
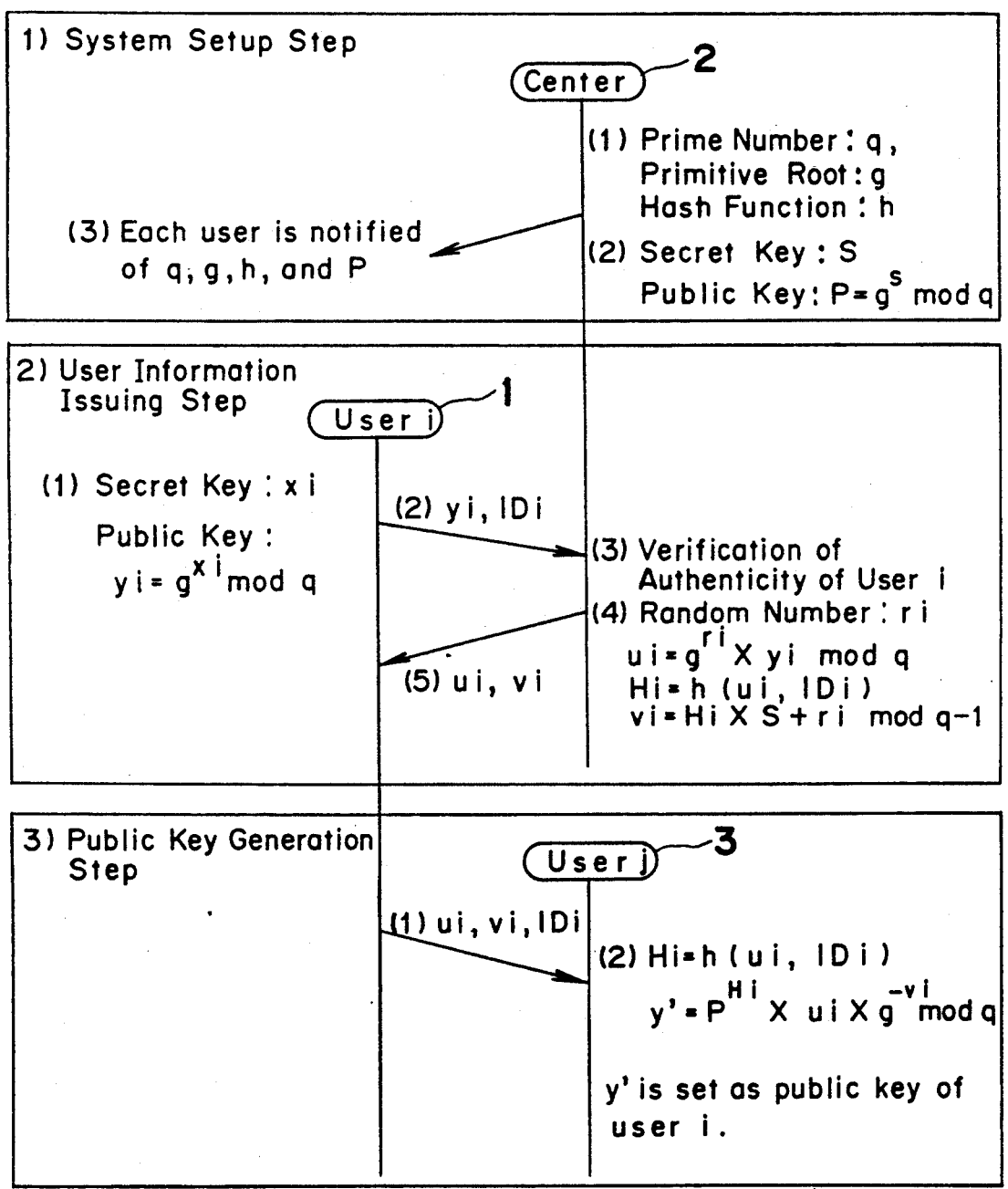
FIG. 1 shows the construction of the public key generation method in accordance with a first embodiment of the present invention.

FIG. 1 shows the construction of the public key generation method according to the first embodiment of the present invention. In FIG. 1, a user i is indicated at 1, a center at 2 and a user j at 3.

Referring now to FIG. 1, the procedure of the first embodiment is described below, organizing it into three steps: 1) system setup step carried out by a center for system construction, 2) user information issuing step required for a user to subscribe to the system, and 3) public key generation step performed for users to acquire their authentic public keys between them.

1) System setup step (1) The center sets up a large prime number q and a primitive root g of the residue-class field with q as modulus. The center then sets up a hash function h. The hash function, defined as a one-way function which compresses input data, presents difficulties in determining any pair of inputs which provides identical outputs.

(2) The center sets up a secret key S, and calculates a public key P by means of the following equation:

$$P = g^S \bmod q \qquad [100]$$

(3) The center notifies each user of (q, g, h, P).

2) User information issuing step

Described below is the case where the arbitrary user i has user information issued by the center.

(1) The user i sets up a secret key xi, and calculates a public key yi corresponding to the secret key xi by the equation:

$$yi = g^{xi} \bmod q \qquad [101]$$

(2) The user i requests the center to issue the user information by notifying it of the public key yi and its own identification information IDi.

(3) The center verifies that the user who requests the issue of the user information is the authentic user i. The explanation of this verification step is skipped, because it falls outside the present invention.

(4) The center generates random number ri, and calculates the user information ui and vi using the center's own secret key S by the following equations:

$$ui = g^{ri} \times yi \bmod q \qquad [102]$$

$$Hi = h(ui, IDi)$$

$$vi = Hi \times S + ri \bmod (q-1) \qquad [103]$$

(5) The center delivers to the user i the user information ui and vi of the user i via a public communications path.

3) Public key generation step

Described below is the procedure in which the arbitrary user j acquires the public key of the arbitrary user i.

(1) The user i notifies the user j of the identification information IDi and the user information ui and vi, both issued in step 2) by the center.

(2) The user j performs the following calculations to determine the value y', and establishes y' as the public key of the user i.

$$Hi = h(ui, IDi)$$

$$y' = P^{Hi} \times ui \times g^{-vi} \bmod q \quad [104]$$

Where, $$\begin{aligned}
y' &= P^{Hi} \times ui \times g^{-vi} \bmod q \\
&= g^{S \cdot Hi} \times g^{ri} \times yi \times g^{-vi} \bmod q \text{ (from [100] and [102])} \\
&= g^{S \cdot Hi + ri} \times g^{-vi} \times yi \bmod q \\
&= g^{vi} \times g^{-vi} \times yi \bmod q \text{ (from [103])} \\
&= yi
\end{aligned}$$

That is to say, the value the user j calculates in equation [104] agrees with the public key yi the user i has previously determined in equation [101].

In the above embodiment, the user j generates the public key of the user i, using the user information which the center has generated, the identification information of the user i, and the center's public information. So it is one of public key generation methods. Since the user i generates its own secret key and public key by itself, even the center cannot know the user's secret key. Information exchanged between the center and the user in both (2) and (5), step 2), is all publicly released values; thus, no secret communications path is necessarily provided between them.

The first embodiment described above is now discussed from the point of security.

(1) Security of the center's secret key

Determining the secret key S from the public key P of the center is difficult, depending on the discrete logarithm problem. The security of the center's secret key is assured in terms of process amount involved in calculations, if a large prime number is set to the modulus q as much as 512 bits or so, and if (q−1) is so set that it has a large prime number as its divisor.

The center needs to update random number ri each time the user information is generated. If the user information (ui, vi) of the user i and the user information (uj, vj) of the user j are generated using the same random number ri, the user i and the user j, if both cooperate, can determine the secret key of the center by means of the following equation:

$$S = (vi - vj)/(Hi - Hj) \bmod (q-1)$$

Also, if the relationship between random number ri and rj, both employed to produce the user information of the user i and the user j, are clarified, that is, if c of the equation, $ri = c \times rj \ (q-1)$, is determined, the center's secret key can be determined from the equation:

$$S = (vi - c \times vj)/(Hi - c \times Hj) \bmod (q-1)$$

However, if some user else attempts to determine c from the public information, c needs to be determined from the equation: $(ui/yi) = (uj/yj)^c \bmod q$. This problem is difficult to solve, depending on the discrete logarithm problem, except that the output is trivial.

(2) Security of the user's secret key

Even the center as well as some user else has difficulties in determining the secret key xi of the user i from the public key yi of the user i depending on the discrete logarithm problem involved. For a third user to forge the secret key of the user i, the third user needs to determine u' and v' that satisfy the following equation:

$$g^{x'} \times g^{v'} = P^{h(u' \cdot IDi)} \times u' \bmod q \quad [105]$$

where x' is a forged secret key of the user i.

This process makes y', which the user j calculates from the equation [104], agree with the public key corresponding to the forged secret key x'. The forger has a great difficulty in determining v' and x', both of which satisfy the equation [105], with any value optionally set to u', depending on the discrete logarithm problem involved. Also, the process the forger experiences in determining u' and x' in the equation [105] with any value optionally set to v' is expected to be at least as difficult as the discrete logarithm problem. Thus, as described above, it is impossible to forge the secret key on condition that q is set as large as a prime number of 512 bits or so, and that (q−1) is so set that it has a large prime number as its divisor.

Listed below are traffic between the user i and the user j and process amount involved in calculations on the users in the public key generation step in the first embodiment.

Traffic: $3 \times \log_2 q$ bits (where ui, vi, IDi < q)

Process Amount: Approx. ($1.5 \times \log_2 q + 0.25 \times \log_2 Hi$) times of residue of the multiplication calculation process per $\log_2 q$ bit width on average Among other calculations in the user j, a power operation with a hash function value Hi set as exponent is alleviated by lowering the output of the hash function down to a limit (for example, 128 bits), within which the security still remains free from deterioration. Substituting 512 for $\log_2 q$, and 128 for $\log_2 Hi$, in the above characteristic equations, results in a traffic of 1536 bits. The overall process amount by users is thus 800 times or so of residue of the multiplication calculation process per 512 bit width on average.

Figure 2:
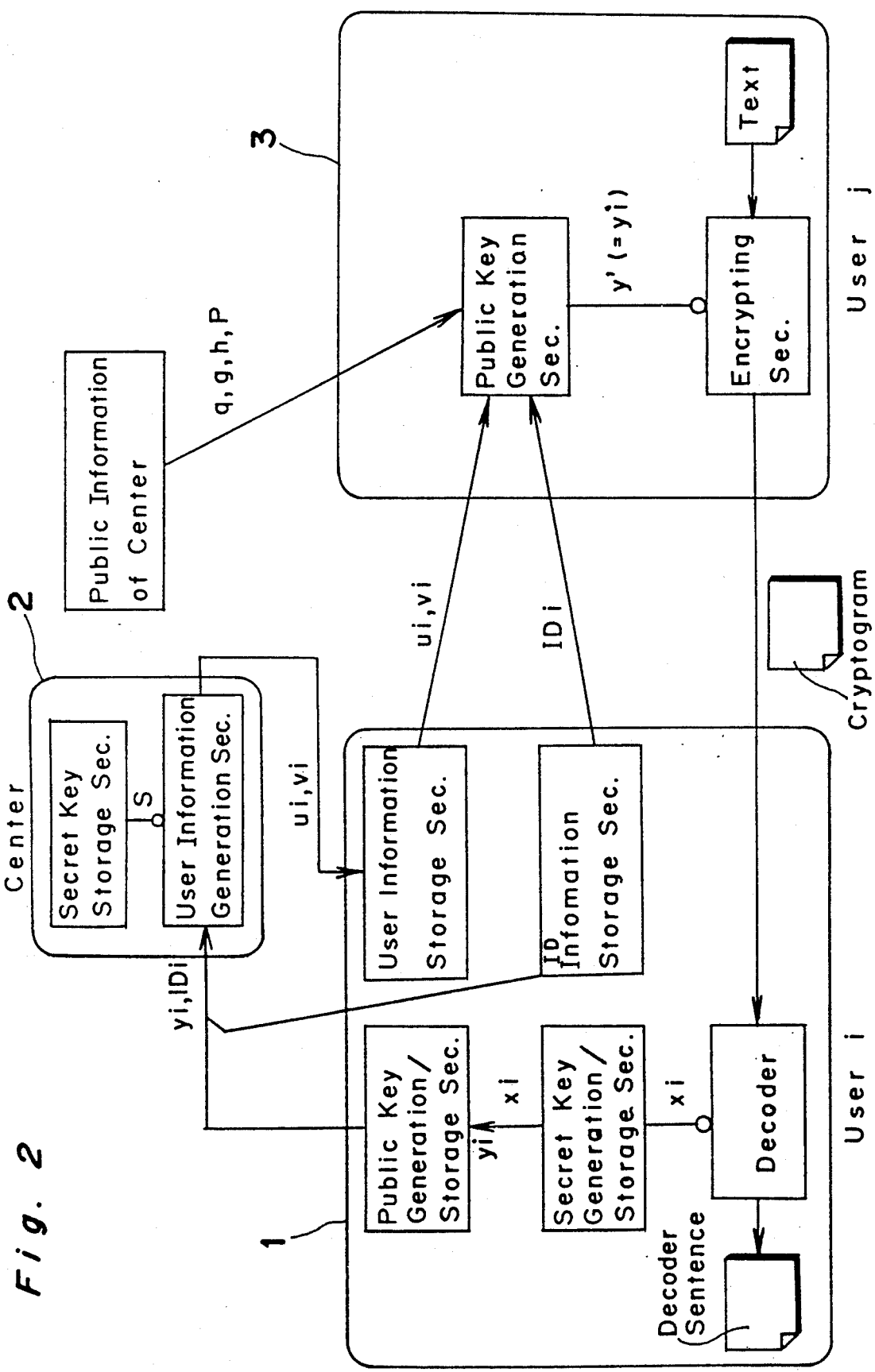
FIG. 2 is a block diagram showing an apparatus for executing the public key generation method of the first embodiment.

FIG. 2 is a block diagram showing an apparatus for executing the public key generation method in FIG. 1. This apparatus is composed of a center device 2, a user terminal 1 and a user terminal 3. The center device 2 includes a secret key storage section and a user information generation section. The secret key storage section memorizes the secret key S thereof decided by (2) of step 1) in FIG. 1. The user information generation section performs the calculation of (4) of step 2) in FIG. 1.

FIG. 2 shows also the secret communication from user j to user i using the user i's public key generated by the public key generation method.

The user terminal 1 includes a public key generation/storage section, a secret key generation/storage section, a user information storage section, an ID(identification) information storage section and a decoder. The public key generation/storage section calculates and memorizes the public key yi in (1) of step 2) in FIG. 1. The secret key generation/storage section sets up and memorizes the secret key xi of the user i in (1) of step 2) in FIG. 1. The user information storage section memorizes user information ui and vi delivered in (5) of step 2) in FIG. 1. The ID information storage section memorizes the ID of the user i. The decoder decodes a cryptogram by means of the secret key xi and acquires a decoded sentence.

The user terminal 3 includes a public key generation section and an encrypting section. The public key generation section produces the public key y' of the user i by conducting the calculation of (2) of step 3) in FIG. 1. The encrypting section encrypts a text by means of the public key of the user i and transmits the cryptogram.

Embodiment 2

Figure 3:
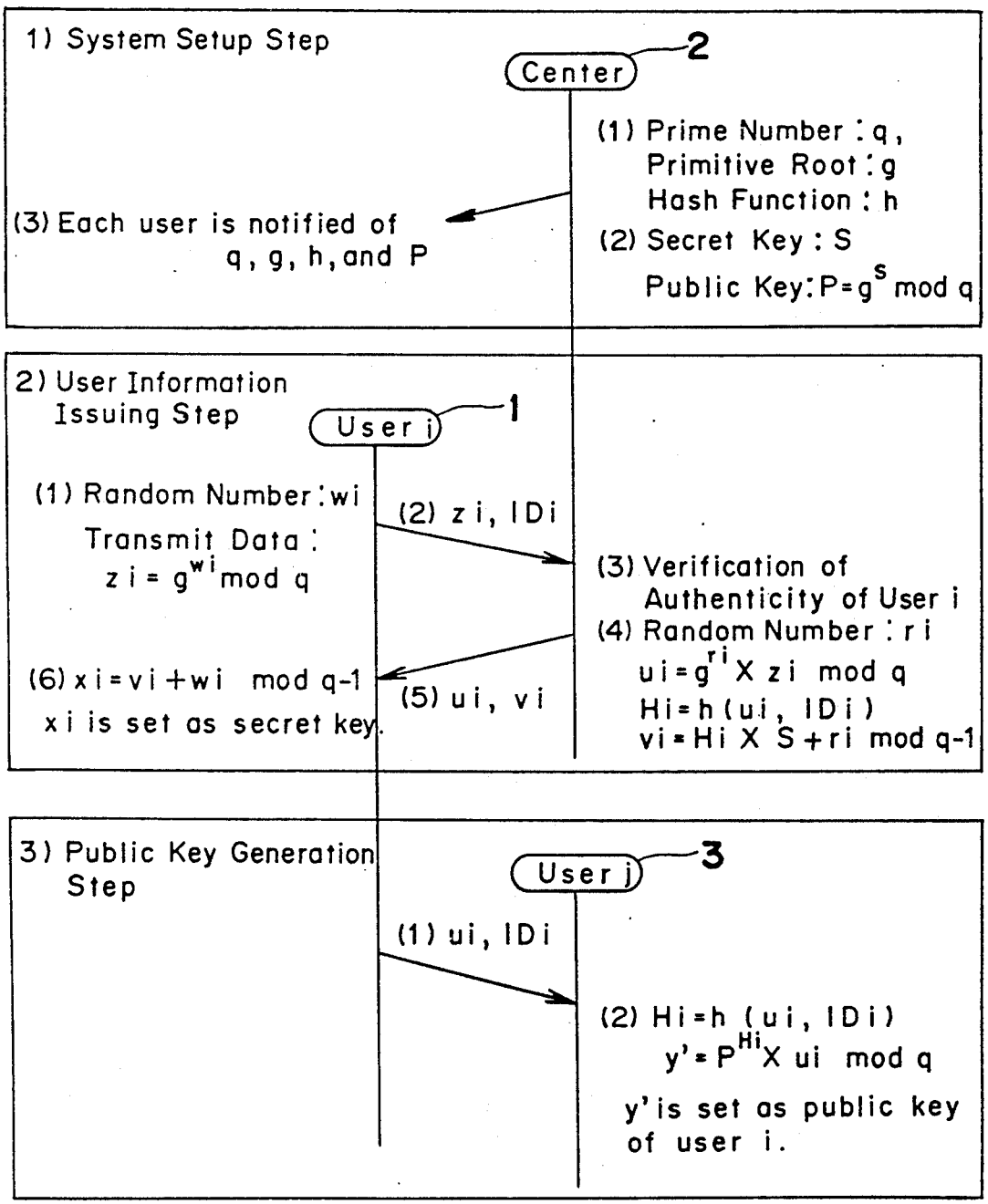
FIG. 3 shows the construction of the public key generation method in accordance with a second embodiment of the present invention.

FIG. 3 shows the construction of the public key generation method according to the second embodiment of the present invention. In FIG. 3, a user i is indicated at 1, a center at 2 and a user j at 3. Referring now to FIG. 3, the procedure of the second embodiment is described below.

1) System setup step (1) The center sets up a large prime number q and a primitive root g of the residue-class field with q as modulus. The center then sets up a hash function h.

(2) The center sets up a secret key S, and calculates the public key P from the following equation:

$$P = g^S \bmod q \quad [106]$$

(3) The center notifies each user of (q, g, h, P).

2) User information issuing step

Described below is the case where the arbitrary user i has user information issued by the center.

(1) the user i generates random number wi, and calculates zi from the following equation:

$$zi = g^{wi} \bmod q \quad [107]$$

(2) The user i requests the center to issue the user information by notifying it of zi and the identification information IDi of the user i.

(3) The center verifies that the user who requests the issue of the user information is the authentic user i.

(4) The center generates random number ri, one different from user to user, and calculates the user information ui and vi using the center's own secret key S as follows:

$$ui = g^{ri} \times zi \bmod q \quad [108]$$

$$Hi = h(ui, IDi)$$

$$vi = Hi \times S + ri \bmod (q-1) \quad [109]$$

(5) The center delivers to the user i the user information ui and vi via a public communications path:

(6) Receiving the user information from the center, the user i generates its own secret key xi using the random number wi that has been generated when the user information is requested to the center, according to the following equation:

$$xi = vi + wi \bmod (q-1) \quad [110]$$

3) Public key generation step

Described below is the procedure in which the arbitrary user j acquires the public key of the arbitrary user i.

(1) The user i sends to the user j the identification information IDi and ui only of the user information issued in step 2) by the center.

(2) The user j performs the following calculations to determine the value y', and establishes y' as the public key of the user i.

$$Hi = h(ui, IDi)$$

$$y' = P^{Hi} \times ui \bmod q \quad [111]$$

Where, $$\begin{aligned} y' &= P^{Hi} \times ui \bmod q \\ &= g^{S \cdot Hi} \times g^{ri} \times zi \bmod q \text{ (from [106] and [108])} \\ &= g^{Hi \cdot S} \times g^{ri} \times g^{wi} \bmod q \text{ (from [107])} \\ &= g^{Hi \cdot S + ri + wi} \bmod q = g^{vi + wi} \bmod q \text{ (from [109])} \\ &= g^{xi} \bmod q \text{ [110])} \end{aligned}$$

That is to say, the value the user j calculates in equation [111] agrees with the public key corresponding to the secret key xi of the user i determined by the equation [110].

In the second embodiment mentioned above, the secret key xi of the user i is generated using the secret random number wi of the user i. Even the center, therefore, cannot know the secret key of the user. Like the first embodiment, no secret communications path is required between the user and the center in step 2). Furthermore, the security consideration already discussed in the embodiment 1 also applies to the embodiment 2.

In the second embodiment, the secret key is generated, based on the user information authenticated and issued by the center, as the equation [110] suggests. Compared with the first embodiment where the user calculates the secret key and the public key, independently of the center who authenticates the public key, the second embodiment has the following features:

(a) The second embodiment is not applicable to the case where two or more centers authenticate the user. The following situation may be one example. A user j relies upon the public key of a center A, and thus, the user j wants to produce the public key of a user i using the center A's public key. On the other hand, a user k who relies upon the public key of a center B wants to produce the public key of the user i using the center B's public key. The user i, authenticated by both the centers A and B, receives user information from each center separately. In such a case, public keys of the user i, resulting from one piece of user information from the center A and another piece of user information from the center B, are different from each other. Thus, the requirements of the user j and the user k cannot be satisfied at the same time.

(b) The second embodiment is not flexible enough to accommodate hierachization in its structure. It is now assumed that a hierarchical system is introduced in the second embodiment so that the center 2, authenticated by a higher level center, receives the user information. To produce the secrete key of each user or center, each user or center needs the user information which is issued by a higher level center using its secret key. This means that each secret key should be determined top-down from the highest level centers in the hierarchial system. When the hierarchical system needs some modification, like addition of a new center, or deletion of some centers, each secret key has to be redetermined on the highest level first.

Listed below are traffic between the user i and the user j and process amount involved in calculations on the users in the public key generation step of the second embodiment.

*Traffic: $2 \times \log_2 q$ bits (where ui, IDi < q)*

Process Amount: Approx. $1.5 \times \log_2 Hi$ times of residue of the multiplication calculation process per $\log_2 q$ bit width on average Substituting 512 for $\log_2 q$, and 128 for $\log_2 Hi$, as in the first embodiment, results in a traffic of 1024 bits. The overall calculation process amount by users is thus 192 times of residue of the multiplication calculation process per 512 bit width on average. These values, substantially smaller than those in the first embodiment, suggest alleviated workload on the users.

Figure 4:
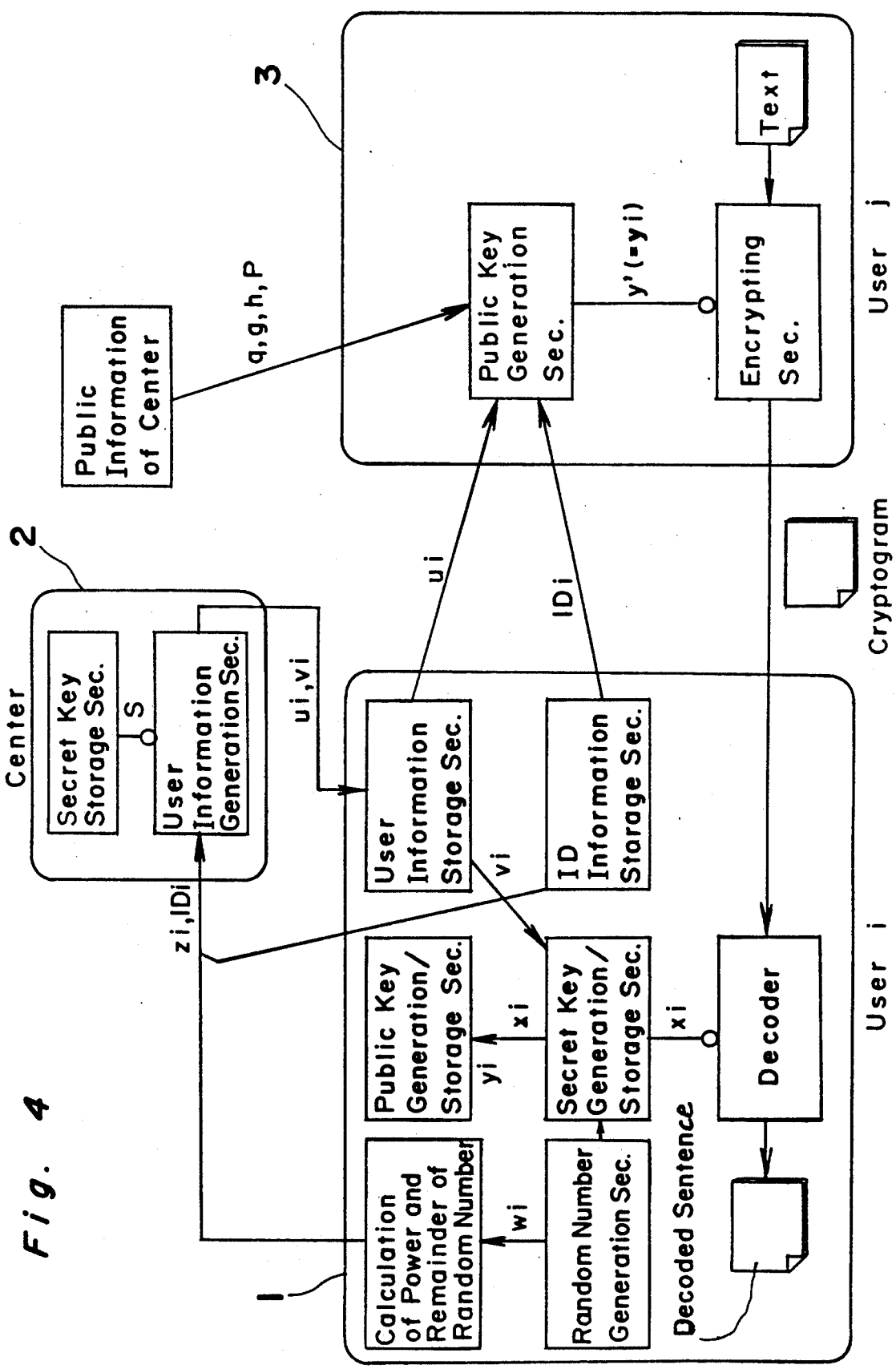
FIG. 4 is a block diagram showing an apparatus for executing the public key generation method of the second embodiment.

FIG. 4 is a block diagram showing an apparatus for executing the public key generation method in FIG. 3. This apparatus is composed of a center device 2, a user terminal 1 and a user terminal 3. The center device 2 includes a secret key storage section and a user information generation section. The secret key storage section memorizes the secret key S decided by (2) of step 1) in FIG. 3. The user information generation section performs the calculation of (4) of step 2) in FIG. 3.

The user terminal 1 includes a public key generation/storage section, a secret key generation/storage section, a user information storage section, an ID(identification) information storage section, a decoder, a random number generation section and a calculation of power and remainder of random number section. The random number generation section sets up a random number wi and the calculation of power and remainder of random number section calculates transmittal data zi in (1) of step 2) in FIG. 3. The secret key generation/storage section calculates and memorizes the secret key xi of the user i in (6) of step 2) in FIG. 3. The public key generation/storage section calculates and memorizes the public key yi based on the secret key xi calculated in (6) of step 2) in FIG. 3. The user information storage section memorizes user information ui and vi delivered in (5) of memorizes user information ui and vi delivered in (5) of step 2) in FIG. 3. The ID information storage section memorizes the ID of the user i. The decoder decodes a cryptogram by means of the secret key xi and acquires the decoded sentence.

The user terminal 32 includes a public key generation section and an encrypting section. The public key generation section produces the public key y' of the user i by conducting the calculation of (2) of step 3) in FIG. 3. The encrypting section encrypts a text by means of the public key of the user i and transmits the cryptogram.

In the embodiments 1 and 2 described above, if a center bears an ill intention, forging will be easily made. In the embodiment 1, for example, the center forges the secret and public keys of the user i, and then generates the user information corresponding to them using the center's own secret key. If a user j sends a cryptogram, i.e. an encrypted message to the user i, by means of the user i's public key which was generated (forged) from the user information, the center can decode the encrypted message using the above-mentioned forged secret key. The above discussion also applies to the embodiment 2; the center can commit wrongdoing by forging the user's secret random number.

A method having a plurality of centers may be considered in order that any center alone has a great difficulty in committing wrongdoing unless all the centers cooperate together. Described below is a method quoted as a third embodiment where the embodiment 1 is extended to have a plurality of centers. For simplicity of description, only two centers are used in the example.

Embodiment 3

Figure 5:
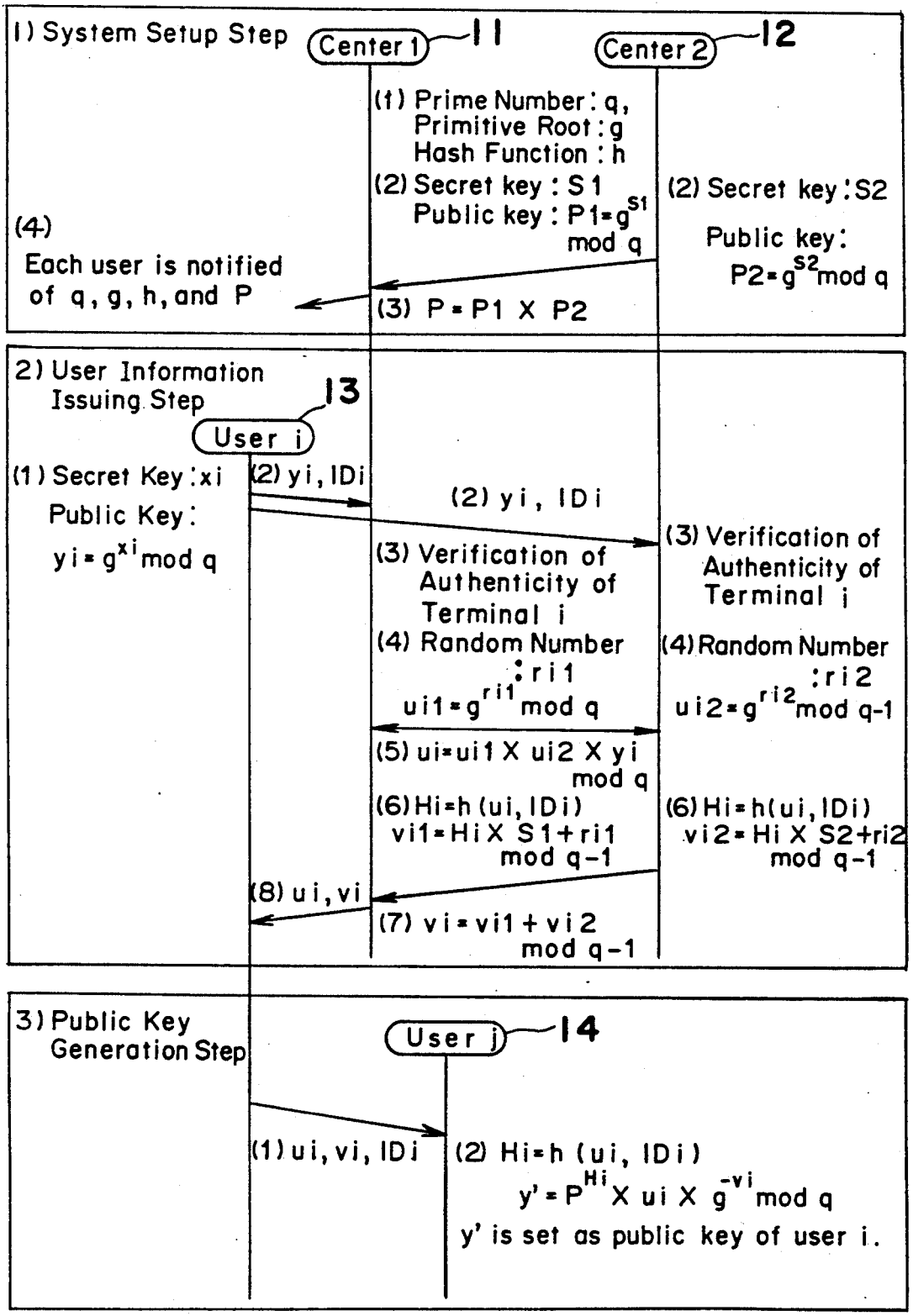
FIG. 5 shows the construction of the public key generation method in accordance with a third embodiment of the present invention.

FIG. 5 shows the construction of the public key generation method according to the third embodiment of the present invention. In FIG. 5, a first center (hereinafter, center 1) is indicated at 11. A second center (hereinafter, center 2) is indicated at 12. A user i and a user j are indicated at 13 and 14, respectively.

Referring now to FIG. 5, the procedure of the third embodiment is described below, organizing the entire procedure into three steps in the same manner as in the embodiment 1.

1) System setup step (1) Both centers 1 and 2, in cooperation, set a large prime number q and a primitive root g of the residue-class field with q as modulus. The centers then set up a hash function h.

(2) The centers 1 and 2 independently produce secret keys S1 and S2, respectively, and determine public keys P1 and P2 according to the following equations. In this case, the secret keys generated are kept in secret from each other center.

(Center 1)

$$P1 = g^{s1} \bmod q \qquad [112]$$

(Center 2)

$$P2 = g^{s2} \bmod q$$

(3) the center 2 sends the public key P2 to the center 1. The center 1 generates the public key P using both the public key P2 and its own public key P1 according to the following equation:

$$P = P1 \times P2 \bmod q \qquad [113]$$

(4) The center 1 notifies each user of (q, g, h, P).

2) User information issuing step

Described below is the case where the arbitrary user i has user information issued by the centers 1 and 2.

(1) The user i sets up a secret key xi, and calculates the public key yi corresponding to xi as follows:

$$yi = g^{xi} \bmod q \qquad [114]$$

(2) The user i requests the centers 1 and 2 to issue the user information by notifying both centers of the public key yi and the identification information IDi of the user i.

(3) Each center verifies that the user who requests the issue of the user information is the authentic user i.

(4) Each center generates a secret random number, one different from user to user, and calculates the first user information ui1 and ui2, respectively.

(Center 1)
Generation of random number ri1

$$ui1 = g^{ri1} \bmod q \qquad [115]$$

(Center 2)
Generation of random number ri2

$$ui2 = g^{ri2} \bmod q$$

(5) The center 2 sends the user information ui2 generated above to the center 1. The center 1 generates the user information ui using the user information ui2 and the user information ui1 generated by itself, according to the equation below. The center 1 then notifies the center 2 of this ui.

$$ui = ui1 \times ui2 \times yi \mod q \qquad [116]$$

(6) Each center independently generates the second user information vi1 and vi2, according to the following equations:

(Center 1)

$$Hi = h(ui, IDi)$$

$$vi1 = Hi \times S1 + ri1 \mod (q-1) \qquad [117]$$

(Center 2)

$$Hi = h(ui, IDi)$$

$$vi2 = Hi \times S2 + ri2 \mod (q-1)$$

(7) The center 2 sends the user information vi2 generated above to the center 1. The center 1 generates user information vi using the user information vi2 and the user information vi1 generated by itself, according to the equation below.

$$vi = (vi1 + vi2) \mod (q-1) \qquad [118]$$

(8) The center 1 notifies the user i of the above (ui, vi) as the user information.

3) User public key generation step

Described below is the procedure in which the arbitrary user j acquires the public key of the arbitrary user i.

(1) The user i notifies the user j of the identification information IDi of the user i and the user information (ui, vi) issued in step 2) by the centers.

(2) The user j performs the following calculations to determine the value y', and establishes y' as the public key of the user i.

$$Hi = h(ui, IDi)$$

$$y' = P^{Hi} \times ui \times g^{-vi} \mod q \qquad [119]$$

Where, $$\begin{aligned}
y' &= P^{Hi} \times ui \times g^{-vi} \mod q \\
&= (P1 \times P2)^{Hi} \times (ui1 \times ui2 \times yi) \times g^{-vi1-vi2} \mod q \\
&\quad \text{(from [113], [116] and [118])} \\
&= (g^{S1+S2})^{Hi} \times g^{ri1} \times g^{ri2} \times yi \times g^{-Hi \cdot S1 - ri1 - Hi \cdot S2 - ri2} \\
&\quad \mod q \text{ (from [112], [115] and [117])} \\
&= yi
\end{aligned}$$

That is to say, the value y' the user j calculates according to the equation [119] agrees with the user i's public key yi determined by the equation [114].

The third embodiment described above is now discussed from the point of security.

(1) Security of the centers, secret keys and users' secret keys

The security consideration already discussed regarding this item in the embodiment 1 equally applies here.

(2) Security against a possible forging of the user information by each center

Since one center has no knowledge of the secret key of the other center, it cannot forge the user information to be generated by the other center. The user information is generated using all individual user information from both centers; thus, one center encounters a great difficulty in determining the user information (ui, vi), if the one attempts to do so alone.

The procedure of the public key generation step in the third embodiment is the same as that of the first embodiment where only one center is employed. Traffic between users and process amount involved in calculations on users remain the same as the case where only one center is employed. Described above is the case where only two centers are employed. Even if the number of centers are N, the public key generation step does not depend on the number N, remaining the same as the case where only one center is employed.

Figure 6:
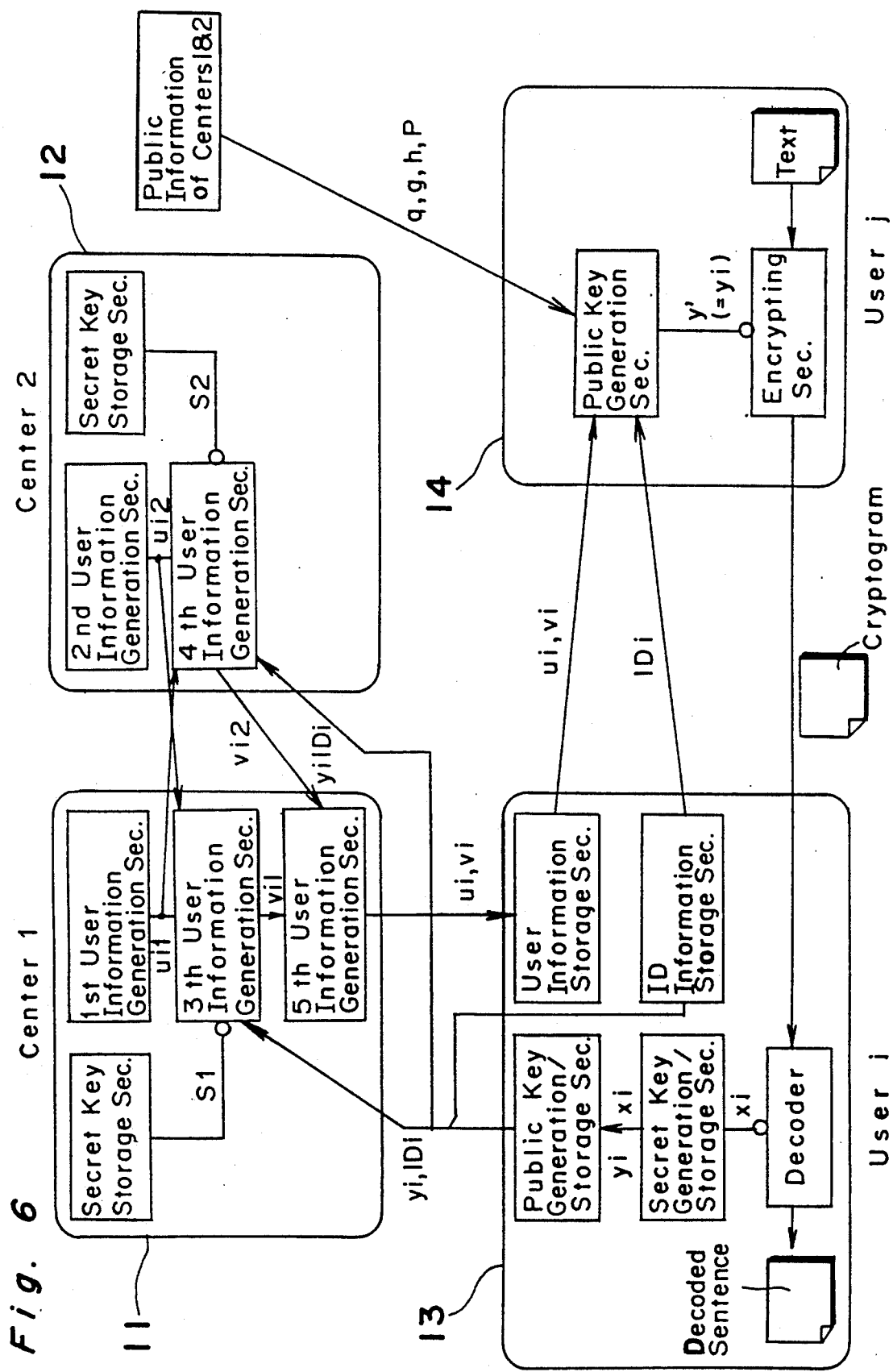
FIG. 6 is a block diagram showing an apparatus for executing the public key generation method of the third embodiment.

FIG. 6 is a block diagram showing an apparatus for executing the public key generation method in FIG. 5. This apparatus is composed of first and second center devices 11 and 12, and user terminals 13 and 14. The first center device 11 includes a secret key storage section, a first user information generation section, a third user information generation section and a fifth user information generation section. The secret key storage section memorizes the secret key S1 of the first center device 11 decided by (2) of step 1) in FIG. 5. The first user information generation section performs the calculation of (4) of step 2) in FIG. 5. The third user information generation section performs the calculation of (5) and (6) of step 2) in FIG. 5. The fifth user information generation section performs the calculation of (7) of step 2) in FIG. 5.

On the other hand, the second center device 12 includes a secret key storage section, a second user information generation section and a fourth user information generation section. The secret key storage section memorizes the secret key S2 of the second center device decided by (2) of step 1) in FIG. 5. The second user information generation section performs the calculation of (4) of step 2) in FIG. 5. The fourth user information generation section performs the calculation of (5) and (6) of step 2) in FIG. 5.

The user terminal 13 includes a public key generation/storage section, a secret key generation/storage section, a user information storage section, an ID(identification) information storage section and a decoder. The public key generation/storage section calculates and memorizes the public key yi in (1) of step 2) in FIG. 5. The secret key generation/storage section sets up and memorizes the secret key xi of the user i in (1) of step 2) in FIG. 5. The user information storage section memorizes user information ui and vi delivered in (8) of step 2) in FIG. 5. The ID information storage section memorizes the ID of the user i. The decoder decodes a cryptogram by means of the secret key xi and acquires the decoded sentence.

The user terminal 14 includes a public key generation section and an encrypting section. The public key generation section produces the public key y' of the user i by conducting the calculation of (2) of step 3) in FIG. 5. The encrypting section encrypts a text by means of the public key of the user i and transmits the cryptogram.

Described below is a method quoted as a fourth embodiment where the embodiment 2 is extended to have a plurality of centers. For simplicity of description here, only two centers, as in the third embodiment, are used in the example below.

Embodiment 4

Figure 7:
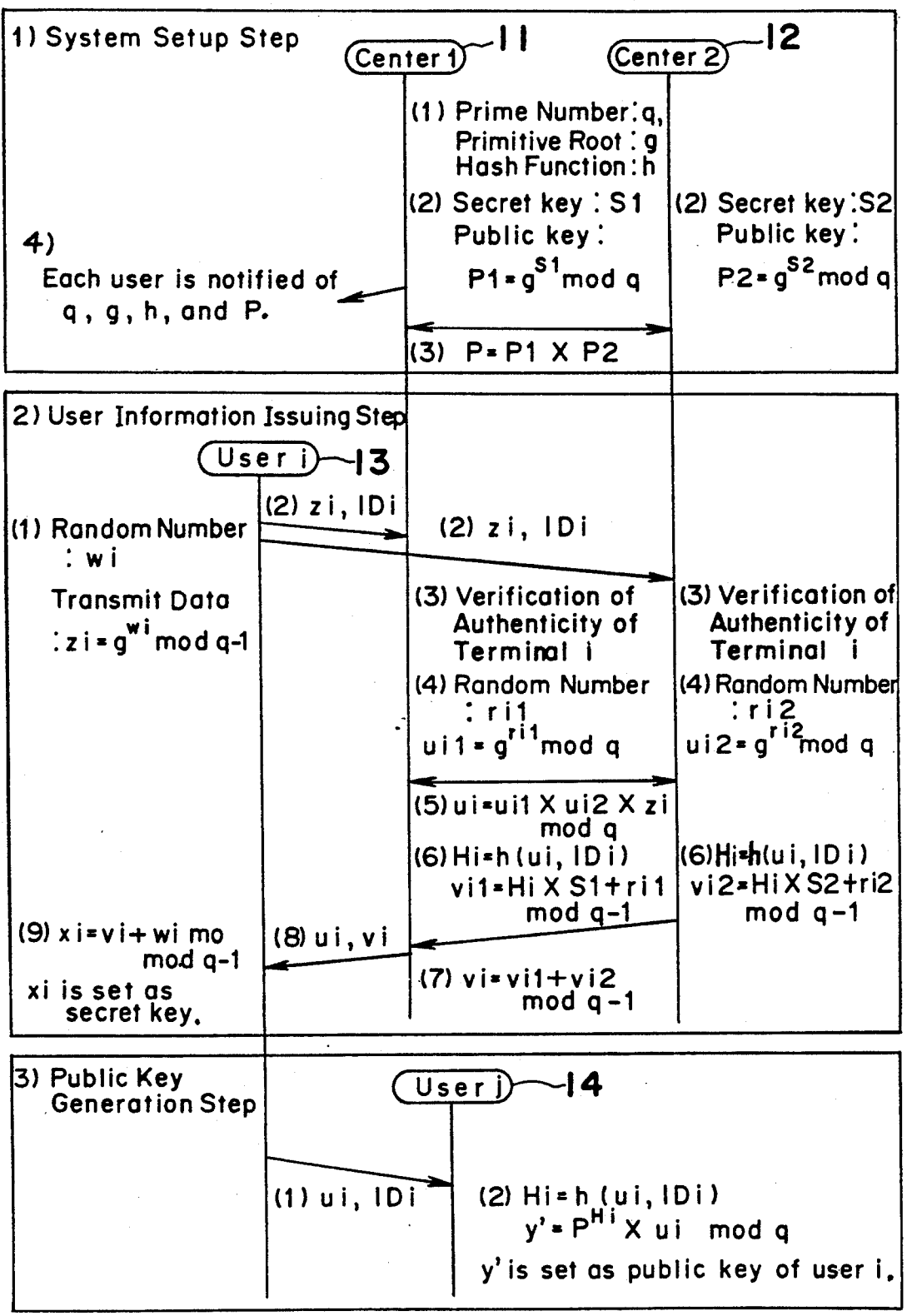
FIG. 7 shows the construction of the public key generation method in accordance with a fourth embodiment of the present invention.

FIG. 7 shows the construction of the public key generation method according to the fourth embodiment of the present invention. In FIG. 7, a first center is indicated at 11. A second center is indicated at 12. A user i and a user j are indicated at 13 and 14, respectively. Referring now to FIG. 7, the procedure of the fourth embodiment is described below.

1) System setup step (1) Both centers 1 and 2, in cooperation, set up a large prime number q and a primitive root g of the remainder field with q as modulus. The centers then set up a hash function h.

(2) The centers 1 and 2 independently produce secret keys S1 and S2, respectively, and determine public keys P1 and P2, respectively, by the following equations. In this case, the secret keys generated are kept in secret from each other center.

(Center 1)

$$P1 = g^{S1} \bmod q \qquad [120]$$

(Center 2)

$$P2 = g^{S2} \bmod q$$

(3) The center 2 sends the public key P2 to the center 1. The center 1 generates the public key P using both the public key P2 and its own public key P1 according to the following equation:

$$P = P1 \times P2 \bmod q \qquad [121]$$

(4) The center 1 notifies each user of (q, g, h, P).

2) User information issuing step

Described below is the case where the arbitrary user i has user information issued by the centers 1 and 2.

(1) The arbitrary user i generates random number wi, and calculates zi from the following equation:

$$zi = g^{wi} \bmod q \qquad [122]$$

(2) The user i requests both center 1 and center 2 to issue the user information by notifying both centers of zi and the identification information IDi of the user i.

(3) Each center verifies that the user who requests the issue of the user information is the authentic user i.

(4) Each center generates random number, one different from user to user, and calculates the first user information ui1 and ui2, respectively.

(Center 1)
Generation of random number ri1

$$ui1 = g^{ri1} \bmod q \qquad [123]$$

(Center 2)
Generation of random number ri2

$$ui2 = g^{ri2} \bmod q$$

(5) The center 2 sends the user information ui2 generated above to the center 1. The center 1 generates the user information ui using the user information ui2 and the user information ui1 generated by itself, according to the equation below. The center 1 then sends this ui to the center 2.

$$ui = ui1 \times ui2 \times zi \bmod q \qquad [124]$$

(6) Each center independently generates the second user information vi1 and vi2, according to the following equations:

(Center 1)

$$Hi = h(ui, IDi) \qquad [125]$$

$$vi1 = Hi \times S1 + ri1 \bmod (q-1)$$

(Center 2)

$$Hi = h(ui, IDi)$$

$$vi2 = Hi \times S2 + ri2 \bmod (q-1)$$

(7) The center 2 sends the user information vi2 generated above to the center 1. The center 1 generates user information vi using the user information vi2 and the user information vi1 generated by itself, according to the equation below.

$$vi = vi1 + vi2 \bmod (q-1) \qquad [126]$$

(8) The center 1 notifies the user i of the above user information ui and vi via a public communications path.

(9) The user i generates its own secret key xi using the random number wi and the above user information vi, according to the following equation:

$$xi = vi + wi \bmod (q-1) \qquad [127]$$

3) User public key generation step

Described below is the procedure in which the arbitrary user j acquires the public key of the arbitrary user i.

(1) The user i notifies the user j of its own identification information IDi and only ui of the user information issued in step 2) by the centers.

(2) The user j performs the following calculations to determine the value y', and establishes y, as the public key of the user i.

$$Hi = h(ui, IDi) \qquad [128]$$

$$y' = P^{Hi} \times ui \bmod q$$

Where, $$\begin{aligned}
y' &= P^{Hi} \times ui \bmod q \\
&= (P1 \times P2)^{Hi} \times (ui1 \times ui2 \times zi) \\
&\quad \bmod q \text{ (from [121] and [124])} \\
&= (g^{S1+S2})^{Hi} \times g^{ri1} \times g^{ri2} \times g^{wi} \\
&\quad \bmod q \text{ (from [120], [123] and [122])} \\
&= g^{(Hi \cdot S1 + ri1) + (Hi \cdot S2 + ri2) + wi} \bmod q \\
&= g^{vi1 + vi2 + wi} \bmod q \text{ (from [125])} \\
&= g^{xi} \bmod q \text{ (from [126] and [127])}
\end{aligned}$$

The value y' the user j calculates according to the equation [128] agrees with the public key corresponding to the secret key xi of the user i determined by the equation [127] (crypto system based on the discrete logarithm problem). The security consideration already discussed in the embodiment 3 also applies to the embodiment 4.

In the fourth embodiment, the secret key of a user is generated, as in the second embodiment, depending on the center who authenticates the key. Therefore, the fourth embodiment has the two features which have already described in the second embodiment.

The procedure of the public key generation step in the fourth embodiment is the same as that of the second embodiment where only one center is employed. Traffic between users and process amount involved in calculations on users remain the same as the case where only one center is employed. Described above is the case where only two centers are employed. Even if the number of centers are N, the public key generation step does not depend on the number N, remaining the same as the case where only one center is employed.

Figure 8:
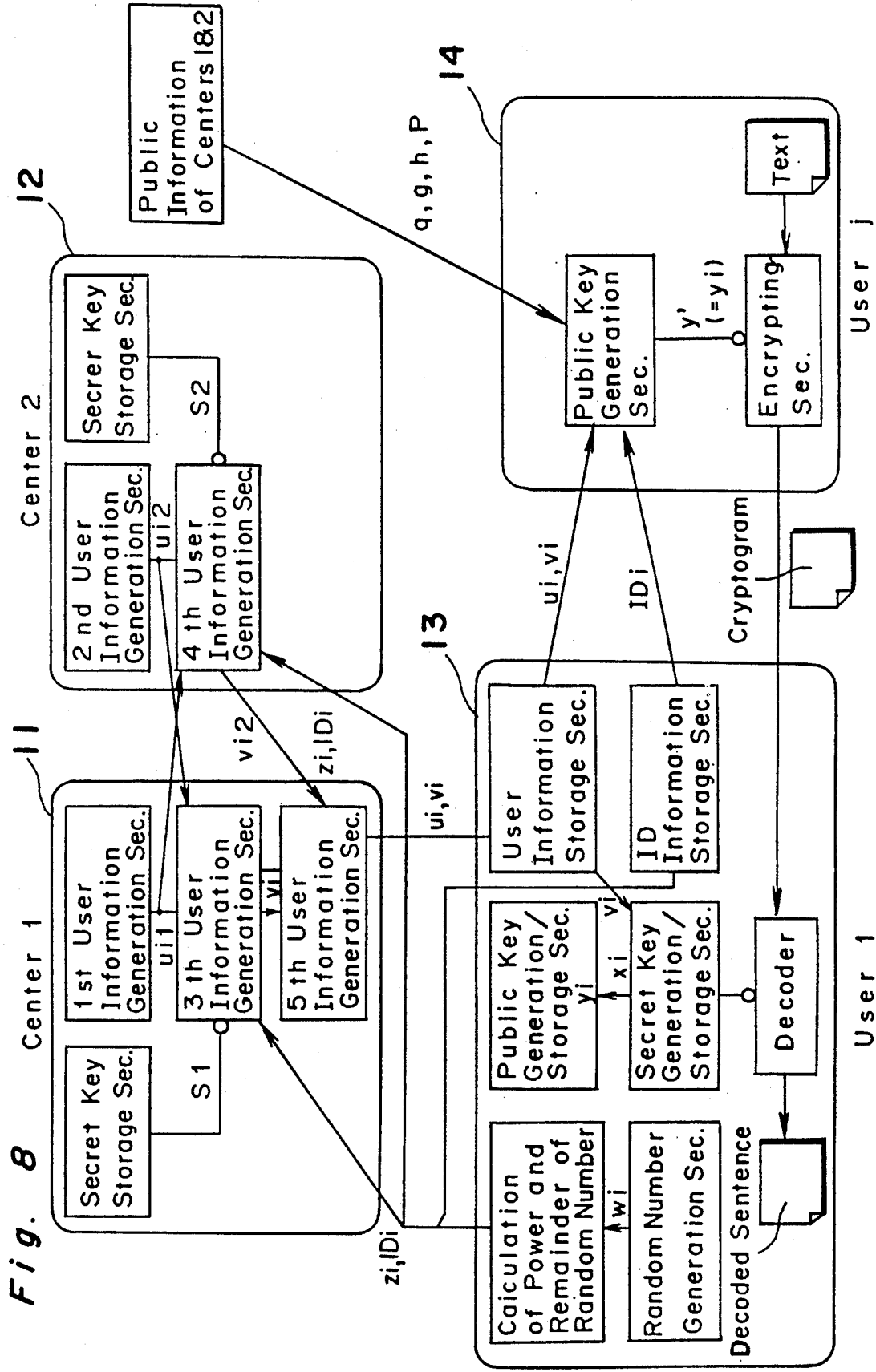
FIG. 8 is a block diagram showing an apparatus for executing the public key generation method of the fourth embodiment.
Figure 9:
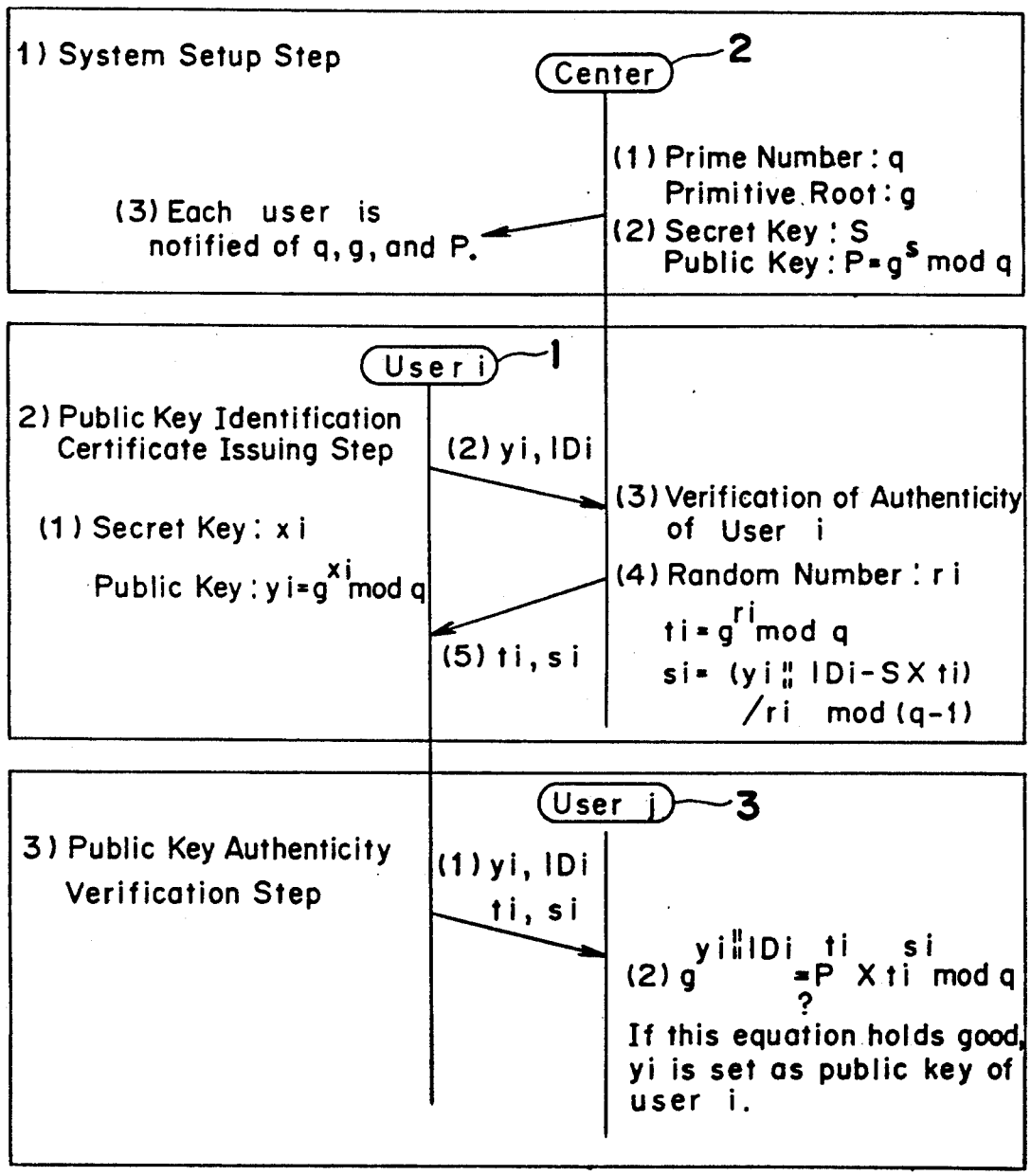
FIG. 9 shows the construction of the first prior art example of the public key identification certificate method.
Figure 10:
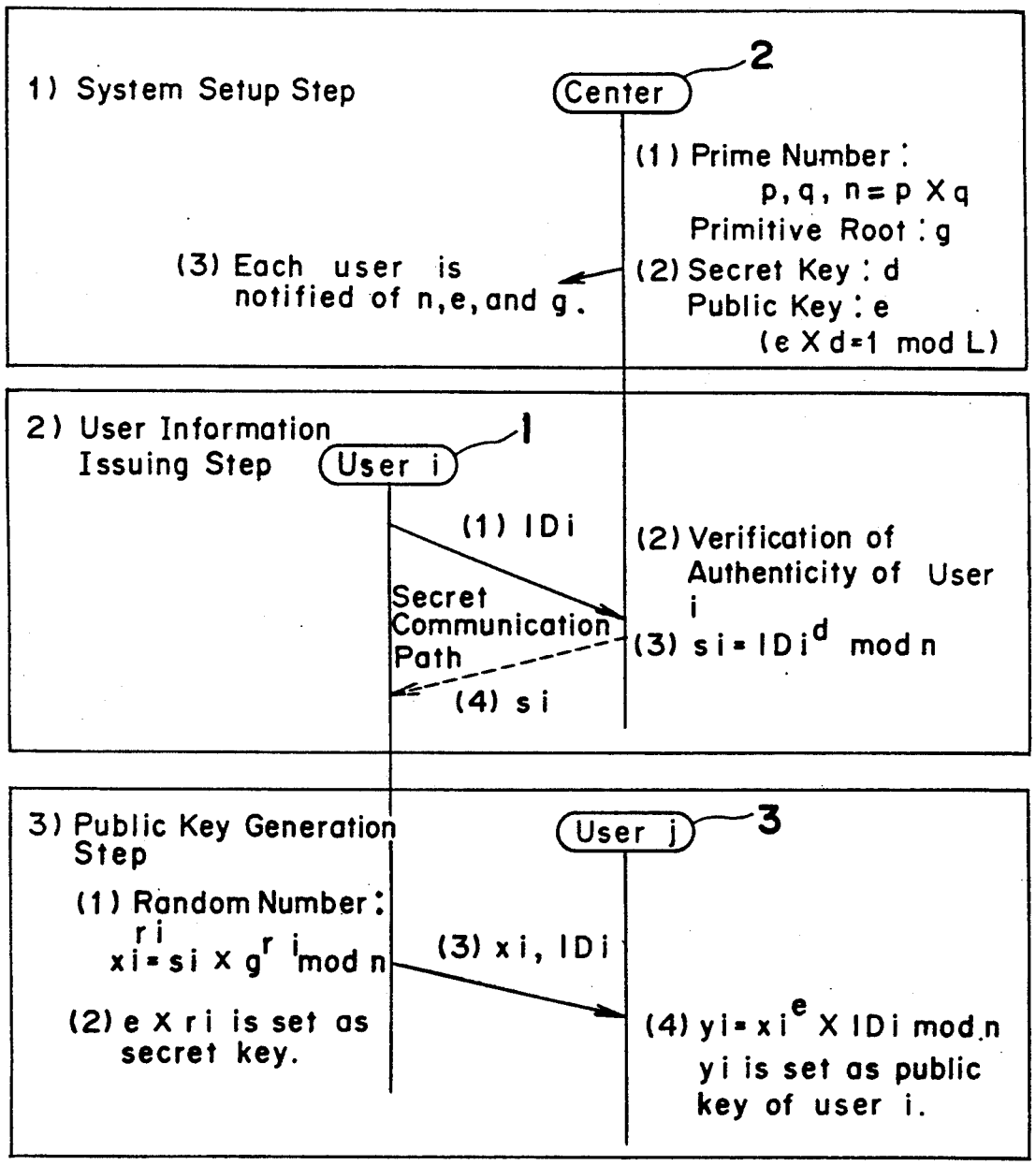
FIG. 10 shows the construction of the second prior art example of the public key generation method.
Figure 11:
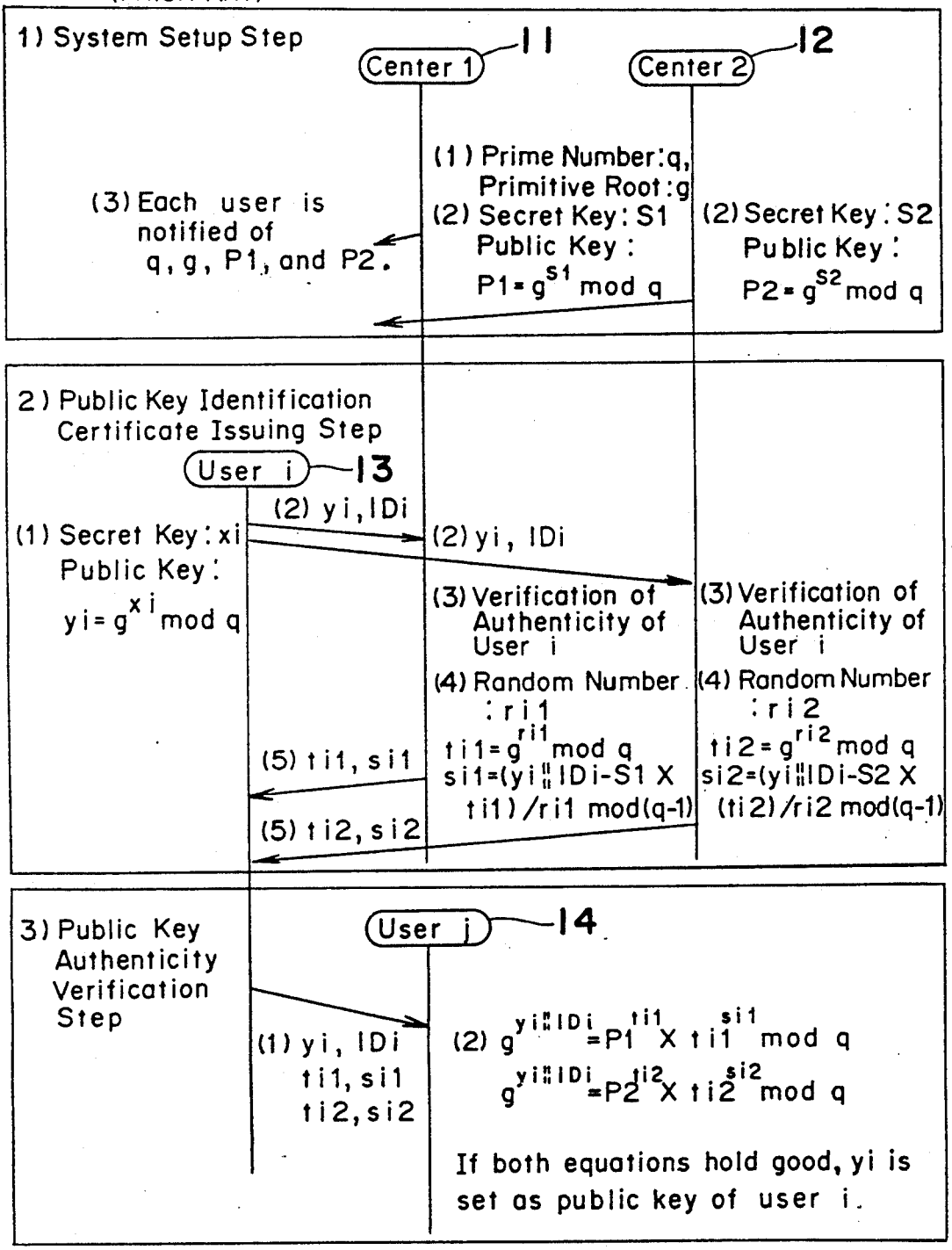
FIG. 11 shows the construction of the third prior art example of the public key identification certificate method.

FIG. 8 is a block diagram showing an apparatus for executing the public key generation method in FIG. 7. This apparatus is composed of first and second center devices 11 and 12, and user terminals 13 and 14. The first center device 11 includes a secret key storage section, a first user information generation section, a third user information generation section and a fifth user information generation section. The secret key storage section memorizes the secret key S1 of the first center device set up in (2) of step 1) in FIG. 7. The first user information generation section performs the calculation of (4) of step 2) in FIG. 7. The third user information generation section performs the calculation of (5) and (6) of step 2) in FIG. 7. The fifth user information generation section performs the calculation of (7) of step 2) in FIG. 7.

On the other hand, the second center device 12 includes a secret key storage section, a second user information generation section and a fourth user information generation section. The secret key storage section memorizes the secret key S2 of the second center device 12 decided in (2) of step 1) in FIG. 7. The second user information generation section performs the calculation of (4) of step 2) in FIG. 7. The fourth user information generation section performs the calculation of (5) and (6) of step 2) in FIG. 7.

The user terminal 13 includes a public key generation/storage section, a secret key generation/storage section, a user information storage section, an ID(identification) information storage section, a decoder and a random number generation section and a calculation of power and remainder of random number section. The random number generation section sets up a random number wi and the calculation of power and remainder of random number section calculates transmittal data zi in (1) of step 2) in FIG. 7. The public key generation/storage section calculates and memorizes the public key yi corresponding to the secret key xi in (9) of step 2) in FIG. 7. The secret key generation/storage section sets up and memorizes the secret key xi of the user i in (9) of step 2) in FIG. 7. The user information storage section memorizes user information ui and vi delivered in (8) of step 2) in FIG. 7. The ID information storage section memorizes the ID of the user i. The decoder decodes a cryptogram by means of the secret key xi and acquires the decoded sentence The user terminal 14 includes a public key generation section and an encrypting section. The public key generation section produces the public key y' of the user i by conducting the calculation of (2) of step 3) in FIG. 7. The encrypting section encrypts a text by means of the public key of the user i and transmits the cryptogram.

In any of the embodiments 1 through 4, g is a primitive root of the residue-class field with q as modulus. The primitive root g is a positive integer equal to or less than (q−1), with q assumed to be a prime number, and the primitive root g to (q−1)st power is 1 in connection with mod q ($g^{q-1} = 1$ mod q). Alternatively, an integer g' may replace g, by using a divisor q' of (q−1); thus, g' to q' power is 1 in connection with mod q ($g^{q'} = 1$ mod q, q': the divisor of q−1). This is fully discussed in the paper authored by C. P. Schnorr, entitled "Efficient Identification and Signatures For Smart Cards" in Proc. CRYPT089. Although the use of g' provides less security against an exhaustive attach to cope with the discrete logarithm problem, compared with the case where the primitive root g is used, the workload involved in calculations on the users is alleviated. For example, calculation process amount of the public key generation step in the first embodiment is approx. $(1.5 \times \log_2 q' + 0.25 \times \log_2 Hi)$ times of residue of the multiplication calculation process per $\log_2 q$ bit width on average. To assure sufficient security, in this case, a value of 140 bits or larger may be used for q'. Substituting 140 for $\log_2 q'$, and 128 for $\log_2 Hi$, results in 242 as the number of iteration in calculation. Therefore, it is almost three times as fast as the first embodiment.

Although the embodiments 1 through 4 are structured on the residue-class field where the prime number q is a modulus, the embodiments may be structured on a finite field which contains elements of the prime number q to the m-th power, $q^m$. In this case, the exponent used in the required multiplication operation needs to be an integer. In the first embodiment, for example, the user information vi obtained from the equation [103] is used as the exponent in the equation [104] which calculates the public key. To make vi an integer, a center may feed ui of the equation [102] to a function where it is converted into a value in the integer domain, and uses the result as the user information.

In the embodiments 1 through 4, the prime number q may be replaced with a composite number n. In this case, the security against wrongdoing by users depends on the difficulty involved in the problem of the discrete logarithm having n as a modulus. When a product of two large prime numbers q1 and q2 is used as the composite number n with the common divisor of (q1−1) and (q2−1) designated q', a positive integer g' may be used instead of the primitive root, wherein g' to q'-th power in connection with mod n is equal to 1 ($g^{q'} = 1$ mod q). Both q' and g' may be publicly released, and a power/remainder operation of g' may be performed by first completing mod q' with power operation, thereby alleviating workload in calculations.

The above is fully discussed in the paper by Marc. Girault, entitled "An Identity-Based Identification Scheme Based On Discrete Logarithms Modulo a Composite Number," in Proc. Eurocrypto90.

Also, assuming that the product n of two prime numbers q1 and q2 is a modulus, and that q, is a least common multiple of both (q1−1) and (q2−1), a positive integer g' may be used instead of the primitive root of the embodiments mentioned above, wherein g' to q'-th power in connection with mod n is equal to 1. In this case, g' is publicly released, but q' is not. A more security-reinforced system can be achieved by keeping q' from being released to users.

In the embodiments 1 through 4, a function expressed below is used as a one-way function.

$$f(x) = g^x \mod q \qquad [129]$$

This function is used because of its features expressed by the following equations:

$$f(a \times b) = \{f(a)\}^b$$

$$f(a+b) = f(a) \times f(b)$$

The public key generation method can be constructed in a similar manner as the embodiments also when the above function is generalized using dyadic operations op1, op2, op3 and op4 as follows:

$$f(op1\ (a,b)) = op2\ (f(a),\ b) \quad [130]$$

$$f(op3\ (a,b)) = op4\ (f(a),\ f(b))$$

where op (a,b) represents the output which a dyadic operation op gives in response to inputs a and b.

In addition to the equation [129], another example of one-way equations which satisfy the equation [130] is a basic equation in connection with the discrete logarithm problem on the elliptic curve.

In the embodiments, the power/remainder operation may be achieved fast by using pre-calculated remainders. Described below is the case where a user performs a power operation of P in the equation [104] in the first embodiment. The user in advance calculates $P^2$ mod q, $P^4$ mod q, $P^8$ mod q, ..., and $P^{2^{(k-1)}}$ mod q (symbol means power operation), storing them in a table. To calculate $P^{Hi}$ mod q, Hi may be binary converted and the tabled value which corresponds to each bit of binary Hi is multiplies on the remainder field. In this case, the number of iteration of the residue of the multiplication calculation process is ($\log_2$ Hi)/2 times on average. Compared with the case where no tabled values are used, faster calculation can be achieved. Centers may prepare the tabled values and deliver them to each user.

Also, in the embodiments, calculation process amount by users can be reduced without impairing the security by replacing the power/remainder operation by repeated multiplication operation. In the first embodiment, for example, the center generates k keys (S1, S2, ..., Sk), and publicly releases remainders (P1, P2, ..., Pk) resulting from power/remainder operation of g to each of k keys. In the user information generation step, the equation [103] is replaced with the following equation:

$$vi = h1 \times S1 + \ldots + hk \times Sk + ri \bmod (q-1)$$

where (hi, ..., hk) are binary values converted from the hash function Hi. In the public key generation step, the calculation of $p^{Hi}$ mod q in the equation [104] is replaced with the following:

$$P1^{h_i} \times \ldots \times Pk^{h_k} \bmod q$$

Since exponent hi (i=1, ..., k) is 0 or 1, only Pi's whose exponents hi's are 1 may be multiplied. This process allows the calculation speed approximately to triple.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A public key generation method having a first user bearing unique identification information, a second user bearing unique identification information, a user information issuing center, and a network which interconnects these, wherein the user information issuing center sets up both a public one-way function f and a public function h, the one-way function f being such a function that, when a first operation op1 and a second operation op2 and a third operation op3 and a fourth operation op4 are assumed to be binomial operation, respectively, and a and b are assumed to be data, respectively, the following equations hold:

$$f(op1\ (a,)) = op2\ (f(a),\ b)$$

$$f(op3\ (a,)) = op4\ (f(a),\ f(b)),$$

the public key generation method comprising:

a system setup step, wherein the user information issuing center sets up a secret key S, keeps it is secret, calculates, as the public key of the user information issuing center, an output value P of the one-way function f taking an input of the secret key S of the user information issuing center, and notifies the first and second users of the public one-way function f, the public function h and the public key P as public information of the user information issuing center;

a user information issuing step, wherein the first user sets up a secret key, calculates, as the public key of the first user, the output value of the one-way function f taking an input of the secret key, notifies the user information issuing center of the public key and the identification information of the first user, and requests issue of the user information of the first user; and wherein the user information issuing center authenticates the first user, generates a random number r, keeps it in secret, calculates the result u of the fourth operation taking inputs of both the output value of the one-way function f, which takes an input of the random number r, and the public key of the first user, inputs the result u and the identification information of the first user into the public function h, calculates the result of the first operation taking inputs of both the secret key S of the user information issuing center and the output value of the function h, calculates the result v of the third operation taking inputs of both the result of the first operation and the random number r, and issues, to the first user, the results u and v as the first user information and the second user information, respectively, of the first user; and a public key generation step, wherein the first user sends to the second user the first user information u, the second user information v, and the identification information of the first user; the second user inputs the result u and the identification information of the first user into the public function h, calculates the result of the second operation taking inputs of both the public key P of the user information issuing center and the output of the function h; taken as the public key of the first user is the result of the fourth operation taking inputs of both the result of the fourth operation, which takes inputs of both the result of the second operation and the user information u, and the inverse number of the output value of the one-way function f taking an input of the second user information v in the fourth operation.

2. A public key generation method having a first user bearing unique identification information, a second user bearing unique identification information, a user information issuing center, and a network which interconnects these, wherein the user information issuing center sets up both a public one-way function f and a public function h, the public key generation method comprising:

a system setup step, wherein, when a prime number or a power of the prime number is assumed to be q, a positive integer g, which is one element of a finite field F having q elements and which is unequal to 1 until it is raised to a t-th power, wherein the exponent t is a divisor of (q−1), is used to make the public one-way function f a power operation of the finite field f, represented by the following equation:

$f(a) = g^a$ (the operation of the finite field F), and wherein the following equations hold:

$f(a \times b) = g^{a \times b} = (g^a)^b = f(a)^b$ $f(a+b) = g^{a+b} = g^a \times g^b = f(a) \times f(b),$ and the user information issuing center sets up the prime number or power of the prime number 1, the positive integer g and the public function h, sets a secret key S of the user information issuing center, keeps it in secret, calculates as the public key of the user information issuing center a power value P of the positive integer g with the secret key S used as exponent in connection with the finite field F, and notifies both the first user and the second user of the prime number 1, the positive integer g, the public function h and the public key P as public information of the user information issuing center; and a user information issuing step, wherein the first user sets up a secret key, keeps it in secret, calculates as the public key of the first user a power of the positive integer g with the secret key of the first user used as exponent in connection with the field F, notifies the user information issuing center of the public key and the user identification information of the first user, and requests issue of the user information of the first user; and wherein the user information issuing center authenticates the first user, generates a random number r, keeps it in secret, calculates a product u of the power f the positive number g with the random number r used as exponent in connection with the field F and the public key of the first user, inputs both the product u and the identification information of the firs user into the public function h, calculates a sum v of the random number r and the product of the output value of the public function h and the secret key S of the user information issuing center with the t used as modulus, and issues to the first user the product u and same v as the first user's first user information and second user information, respectively; and a public key generation step, wherein the first user sends to the second user the first user information u and the second user information v and the identification information of the first user; the second user inputs the first user information of the first user into the public function h, calculates a product of a power of the public key P of the user information issuing center with the output value of the public function h used as exponent in connection with the field F and the first user information u, sets the product of the product and the inverse number of the power of the positive integer g with the second user information v used as exponent as the public key of the first user.

3. A public key generation method having a first user bearing unique identification information, a second user bearing unique identification information, a user information issuing center, and a network which interconnects these, wherein the user information issuing center sets up both a public one-way function f and a public function h, the public key generation method comprising:

a system setup step, wherein n is assumed to be a composite number, and a positive integer g, which is equal to or smaller than (n−1), where both the positive integer and the composite number n are prime with each other, and which is unequal to 1 until it is raised to q-th power, wherein the positive integer q is a divisor of the Euler's function value of n and n as modulus, is used to make the public one-way function of a power operation with n as modulus, represented by the following equation:

$f(a) = g^a \bmod n$ wherein the following equations hold:

$f(a \times b) = g^{a \times b} \bmod n = )g^a)^b \bmod n = f(a)^b$ $f(a+b) = g^{a+b} \bmod n = g^a \times g^b \bmod n = f(a) \times f(b)$ and the user information issuing center sets up the composite number n, the positive integer g and the public function h, sets up a secret key S of the user information issuing center, keeps it in secret, calculates as the public key P of the user information issuing center a power value P of the positive integer g, where the composite number n is used as modulus and the secret key S as exponent, and notifies the first and the second users of the composite number n, the divisor 1, the positive integer g, the public function h, and the public key P as the public information of the user information issuing center; and a user information issuing step, wherein the first user sets up a secret key, keeps it in secret, calculates as the public key of the first user a power value of the positive integer g with the composite number n used as modulus and the secret key of the first user as exponent, notifies the user information issuing center of the public key and the user identification information of the first user, and requests issue of the user information of the first user; and wherein the user information issuing center authenticates the first user, generates a random number r, keeps it secret, calculates a product us of the power value of the positive integer g with the random number r as exponent and the public key of the first user with the composite number n used as modulus, inputs the product u and the identification information of the first user into the public function h, calculates a sum v of the random number r and the product of the output value of the public function h and the secret key S of the user information issuing center with the divisor q used as modulus, and issues to the first user, the product u and sum v, as the first user's first user information and second user information, respectively; and a public key generation step, wherein the first user sends to the second user the first user information u, the second user information v, and the identification information of the first user; and wherein the second user inputs the first user information u and the identification information of the first user into the public function h, calculates the output value of the public function h with the prime number q as modulus, calculates a product of a power value of the public key P of the user information issuing center with the composite number n used as modulus and the output value of the public function h as exponent, an the first user information u, and sets a product of the product and the inverse number of a power value of g with the second user information v used as exponent, as the public key of the first user.

4. A public key generation method as claimed in claim 3, wherein the divisor 1 is the secret information of the user information issuing center.

5. A public key generation method having a first user bearing unique identification information, a second user bearing unique identification information, a user information issuing center, and a network which interconnects these, wherein the user information issuing center sets up both a public one-way function f and a public function h, the one-way function f being such a function that, when a first operation op1 and a second operation op2 and a third operation op3 and a fourth operation op4 are assumed to be binomial operations, respectively, and a and b are assumed to be data, respectively, the following equations hold:

$f(op1\ (a,\ b)) = op2\ (f(a),\ b)$ $f(op3\ (a,\ b)) = op4\ (f(a), f(b))$, the public key generation method comprising:
a system setup step, wherein the user information issuing center sets up a secret key S, keeps it in secret, calculates as the public key of the user information issuing center an output value P of the one-way function f taking an input of the secret key s of the user information issuing center and notifies both the first and the second users of the f, the public function h and the public key P as the public information of the user information issuing center;
a user information issuing step, wherein the first user generates a random number w, and keeps it in secret, notifies the user information issuing center of an output value z of the one-way function f taking an input of the random number w and the user identification information of the first user, and requests issue of the user information of the first user; and wherein the user information issuing center authenticates the first user, generates a random number r, keeps it in secret, calculates the result u of the fourth operation taking inputs of both the output value of the one-way function f taking an input of the random number r and transmit data z from the first user, inputs the result u and the identification information of the first user into the public function h, calculates the result of the first operation taking inputs of both the secret key S of the user information issuing center and the output value of the function h, calculates the result v of the third operation taking inputs of both the result of the first operation and the random number r, and issues to the first user the results u and v as the first user's first user information and second user information, respectively; and wherein the first user calculates the result of the third operation taking inputs of both the second information v and the random number w, and keeps it in secret as a secret key x of the first user; and a public key generation step, wherein the first user sends to the second user the first user information u, and the identification information of the first user; and wherein the second user inputs the result u and the identification information of the first user into the public function h, calculates the result of the second operation taking inputs of both the public key P of the user information issuing center and the output of the function h, sets the result of the fourth operation taking inputs of both the result of the second operation and the firs user information u as the public key of the first user.

6. A public key generation method having a first user bearing unique identification information, a second user bearing unique identification information, a user information issuing center, and a network which interconnects these, wherein the user information issuing center sets up both a public one-way function f and a public function h, the public key generation method comprising:
a system setup step, when a prime number or a power of the prime number is assumed to be q, a positive integer g, which is one element of a finite field F having q elements and which is unequal to 1 until it is raised to a t-th power, wherein the exponent t is a divisor of $(q-1)$, is used to make the public one-way function f a power operation of the finite field F, represented by the following equation:

$f(a \times b) = g^a$ (the operation of the finite field F), wherein the following equations hold:

$f(a+b) = g^{a+b} = g^a \times g^b = f(a) \times f(b)$, and the user information issuing center sets up the prime number of power of the prime number 1, the positive integer g and the public function h, sets up a secret key S of the user information issuing center, keeps it in secret, calculates as the public key of the user information issuing center a power P of the positive integer g with the secret key S used as exponent in connection with the field F, and notifies both the first user and the second user of the prime number 1, the positive integer g, the public function h and the public key P as the public information of the user information issuing center;
a user information issuing step, wherein the first user generates a random number w, keeps it is secret, notifies the user information issuing center of a power z of the positive integer g with the random number w used as exponent in connection with the field F, and notifies both the first user and the second user of the prime number 1, the positive integer g, the public function h and the public key P as the public information of the user information issuing center;
a user information issuing step, wherein the first user generates a random number w, keeps it is secret, notifies the user information issuing center of a power z of the positive integer g with the random number w used as exponent in connection with the field F and the user identification information of the first user, and requests issue of the user information of the first user; and wherein the user information issuing center authenticates the first user, generates a random number r, keeps it in secret, calculates a product us of a power of the positive integer the positive integer g with the random number r used as exponent in connection with the field F and transmit data Z from the first user, inputs the result u and the identification information of the first user into the public function h, calculates a sum v of the random number r and a product of the output value of the public function h and the secret key s of the user information issuing center with the exponent t used as modulus, the secret key S of the user information issuing center, and issues to the first user the product u and sum v as the first user's first user information and second user information, respectively; and wherein the first user calculates the exponent t from the prime number 1, calculates a sum of the second user information v and the random number w with the t as modulus, and keeps the sum in secret as the secret key of the first user; and a public key generation step, wherein the firs user sends to the second user th first user information and the identification information of the first user; and wherein the second user inputs the result u and the identification information of the first user into the public function h, and sets a product of the first user information u and a power of the public key P of the user information issuing center with the output value of the public function h used as exponent in connection with the field F as the public key of the first user.

7. A public key generation method having a first user bearing unique identification information, a second user bearing unique identification information, a user information issuing center, and a network which interconnects these, wherein the user information issuing center sets up both a public one-way function f and a public function h, the public key generation method comprising:

a system setup step, wherein n is assumed to be a composite number, and a positive integer g, which is equal to or smaller than $(n-1)$, where both the positive integer g and the composite number n are prime with each other, and which is unequal to 1 until it is raised to q-th power, wherein the positive integer q is a divisor of the Euler's function value of n with n as modulus, is used to make the public one-way function f a power operation with n as modulus, represented by the following equation:

$f(a) = g^a \bmod n$ where the following equations hold:

$f(a \times b) = g^{a \times b} \bmod n = (g^a)^b \bmod n = f(a)^b$ $f(a+b) = g^{a+b} \bmod n = g^a \times g^b \bmod n = f(a) \times f(b)$ and the user information issuing center sets up the composite number n, the positive integer g and the public function h, sets a secret key S of the user information issuing center, keeps it in secret, calculates as the public key o the user information issuing center a power value P of the positive integer g with the composite number n used as modulus and the secret key S as exponent, and notifies the first and the second users of the composite number n, the divisor q, the positive integer g, the public function h, and the public key P as the public information of the user information issuing center;

a user information issuing step, wherein the first user generates a random number w, keeps it in secret, notifies the user information issuing center of a power value z of the positive integer g with the random number w used as exponent an the composite number n used as modulus and the user identification information of the first user, and requests the user information of the first user;

the user information issuing center authenticates the first user, generates a random number r, keeps it in secret, calculates a product us of the transmit data z from the first user and a power value of the positive integer g with the random number r as exponent and the public key of the first user with the composite number n used as modulus, inputs the product us and the identification information of the first user into the public function h, calculates a sum v of the random number r and a product of the output value of the public function h and the secret key S of the user information issuing center with the divisor q used as modulus, and issues to the first user the product u and sum v as the first user's first user information and second user information, respectively; and wherein the first user calculates a sum of the second user information v and the random number w with the divisor q used as modulus, and sets the sum as the secret key of the first user; and a public key generation step, wherein the first user sends to the second user the first user information u and the identification information of the first user; and wherein the second user inputs the result u and the identification information of the first user into the public function h, calculates the output value of the public function h with the divisor 1 used as modulus, sets a product of a power value of the public key P of the user information issuing center with the composite number n used as modulus and the output of the public function h used as exponent, and the first user information u as the public key of the first user.

8. A public key generation method as claimed in claim 7, wherein the divisor 1 is the secret information of the user information issuing center.

9. A public key generation method as claimed in claim 2, wherein the second user preliminary calculates and keeps the power values of the public key P or the power values of the positive integer g with a plurality of fixed values as exponent in connection with the field F to use said field in the public key generation step.

10. A public key generating method as claimed of claim 6, wherein the second user preliminary calculates and keeps the power values of the public key P or the power values of the positive integer g with a plurality of fixed values as exponent in connection with the field f to use said field in the public key generation step.

11. A public key generation method as claimed in claim 3, wherein the second user preliminary calculates and keeps the power values of the public key P of the user information issuing center or the power values of the positive integer g with a plurality of fixed values as exponent and with the composite number n as modulus to use said field in the public key generation step.

12. A public key generation method as claimed in claim 4, wherein the second user preliminary calculates and keeps the power values of the public key P of the user information issuing center or the power values of the positive integer g with a plurality of fixed values as exponent and with the composite number n as modulus to use said field in the public key generation step.

13. A public key generation method as claimed in claim 7, wherein the second user preliminary calculates and keeps the power values of the public key P of the user information issuing center or the power values of the positive integer g with a plurality of fixed values as exponent and with the composite number n as modulus to use said field in the public key generation step.

14. A public key generation method as claimed in claim 8, wherein the second user preliminary calculates and keeps the power values of the public key P of the user information issuing center or the power values of the positive integer g with a plurality of fixed values as exponent and with the composite number n as modulus to use said field in the public key generation step.

15. A public key generation method as claimed in claim 2, wherein:
- in the system setup step, the user information issuing center sets a plurality of secret keys, stores them in secret, calculates, as a plurality of public keys of the user information issuing center, the power values of the positive integer g with the plurality of secret keys using as exponent, respectively, in connection with the finite field F, and
- in the user information issuing step, the user information issuing center selects, among the plurality of secret keys of the user information issuing center, one or more secret keys which correspond to the output values of the public function h, calculates, as second user information, a sum v of these secrete keys and the random number r with the divisor t used as modulus, and
- in the public key generation step, the second user selects, among the plurality of public keys of the user information issuing center, one or more public keys which correspond to the output values of the public function h, and calculates a product of these public keys in connection with the field F.

16. A public key generation method as claimed in claim 6, wherein:
- in the system setup step, the user information issuing center sets a plurality of secret keys, stores them in secret, calculates, as a plurality of public keys of the user information issuing center, the power values of the positive integer g with the plurality of secret keys using as exponent, respectively, in connection with the finite field f, and
- in the user information issuing step, the user information issuing center selects, among the plurality of secret keys of the user information issuing center, one or more secret keys which correspond to the output values of the public function h, calculates, as a second user information, a sum v of these secret keys and the random number r with the divisor t used as modulus, and
- in the public key generation step, the second user selects, among the plurality of public keys of the user information issuing center one or more public keys which correspond to the output values of the public function h, and calculates a product of these public keys in connection with the field F.

17. A public key generation method as claimed in claim 5, wherein:
- in the system setup step, the user information issuing center sets a plurality of secret keys, stores them in secret, calculates, as a plurality of public keys of the user information issuing center, the power values of the positive integer g with the composite number n used as modulus and with a plurality of secret keys each used as exponents, and
- in the user information issuing step, the user information issuing center selects, among the plurality of secret keys of the user information issuing center, one or more secret keys which correspond to the output values of the public function h, calculates, as second user information, a sum v of the one or more secret keys and the random number r with the divisor q used as modulus, and
- in the public key generation step, the step user selects, among the plurality of public keys of the user information issuing center, one or more public keys which correspond to the output values of the public function h, and calculates a product of these public keys with the composite number n used as modulus.

18. A public key generation method as claimed in claim 4, wherein:
- in the system setup step, the user information issuing center sets a plurality of secret keys, stores them in secret, calculates, as a plurality of public keys of the user information issuing center the power values of the positive integer g with the composite number n used as modulus and with a plurality of secret keys each used as exponents, and
- in the user information issuing step, the user information issuing center selects, among the plurality of secret keys of the user information issuing center, one or more secret keys which correspond to the output values of the public function h, calculates, as second user information, a sum v of one or more secret keys and the random number r with the divisor q used as modulus, and
- in the public key generation step, the second user selects, among the plurality of public keys of the user information issuing center, one or more public keys which correspond to the output values of the public function h, and calculates a product of these public keys with the composite number n used as modulus.

19. A public key generation method having a first user bearing unique identification information, a second user bearing unique identification information, a plurality of user information issuing centers, and a network which interconnects these, wherein the user information issuing centers cooperate together to set up both a public one-way function f and a public function h, the one-way function f being such a function that, when a first operation op1 and a second operation op2 and a third operation op3 and a fourth operation op4 are assumed to be polynomial operations, respectively, and a, b, ..., z are assumed to be data, respectively, the following equations hold:

$$f(op1\ (a, b, \ldots, z)) = op2\ (f(a), b, \ldots, z)$$

$$f(op3\ (a, b, \ldots, z)) = op4\ (f(a), f(b), \ldots, f(z)),$$

the public key generation method comprising:
a system setup step, wherein each user information issuing center b sets up a secret key Sb, keeps it in secret, calculates an output value Pb of the one-way function f taking an input of the secret key, notifies the rest of the user information issuing centers of the output value Pb, sets, in cooperation with the rest of the user information issuing centers, the result P of the fourth operation in response to the output value Pb, as the public key of all the user information issuing centers, and notifies the first user and the second user of the public key P, the one-way function f, and the public function h as the public information of all the user information issuing centers;
a user information issuing step, wherein the first user sets up a secret key, calculates as the public key of the first user an output value of the one-way function f taking an input of the secret key, notifies the each user information issuing center of the public key of the first user and the identification information of the first user, and requests issue of the user information of the first user; the each user information issuing center b authenticates the first user, generates a random number rb, keeps it in secret, calculates an output value ub of the one-way function f taking an input of the random number rb, and notifies the rest of the user information issuing centers of the output value;
the each user information issuing center independently calculates the result u of the fourth operation taking inputs of both the each output ub and the public key of the first user, inputs the result u and the identification information of the first user into the public function h, calculates the result of the first operation taking inputs of both the secret key Sb of the each user information issuing center and the output value of the public function, h, calculates the result vb of the third operation taking inputs of both the result of the first operation and the random number rb, and notifies the rest of the user information issuing centers of the result vb; and wherein
the each user information issuing center in cooperation with the rest of the user information issuing centers calculates the result v of the third operation in response to the each vb, and issues, to the first user, the results u and v, as the first user's first user information and second user information, respectively; and
a public key generation step, wherein the first user sends to the second user the first user information u, the second user information v, and the identification information of the first user; and wherein the second user inputs the result u and the identification information of the first user into the public function h, calculates the result of the second operation taking inputs of both the public key P of the user information issuing center and the output of the public function h; taken as the public key of the first user is the result of the fourth operation taking inputs of the result of the fourth operation taking inputs of both the result of the second operation an the first user information u, and the inverse number of the output value of the one-way function f taking an input of the second user information v in the fourth operation.

20. A public key generation method having a first user bearing unique identification information, a second user bearing unique identification information, a plurality of user information issuing centers, and a network which interconnects these, wherein the user information issuing centers cooperate together to set up both a public one-way function f and a public function h, the public key generation method comprising:
a system setup step, wherein when a prime number or a power of the prime number is assumed to be q, a positive integer g, which is one element of a finite field F having q elements and which is unequal to 1 until it is raised to a t-th power, where the exponent t is a divisor of $(q-1)$, is used to make the public one-way function f a power operation of the finite field F, represented by the following equation:

$$f(a)=g^a \text{ (the operation of the finite field F)},$$

where the following equations hold:

$$f(a \times b \times \ldots \times z)=g^{a \times b \times \ldots \times z}=((\ldots(g^a)^b)\ldots)^z=((\ldots f(a)^b)\ldots)^z$$

$$f(a+b+\ldots+z)=g^{a+b+\ldots+z}=g^a \times g^b \times \ldots \times g^z = f(a) \times f(b) \times \ldots \times f(z)$$

and the each user information issuing center, in cooperation with the rest of the user information issuing centers, set up the prime number or power of the prime number q, the positive integer g and the public function h;
the each user information issuing center b independently sets up a secret key Sb, keeps it in secret, calculates a power Pb of the positive integer g with the secret key Sb used as exponent in connection with the field F, and notifies the rest of the user information issuing centers of the power Pb; and wherein
the each user information issuing center, in cooperation with the rest of the user information issuing centers, calculates a product P of the every Pb in connection with the field F, as the public key of all the user information issuing centers, and notifies both the first and second users of the number q, the positive integer g, the public function h and the public key P;
a user information issuing step, wherein the first user sets up a secret key, calculates as the public key of the first user a power of the positive integer g with the secret key of the first user used as exponent in connection with the field F, notifies the each user information issuing center of the public key and the user identification information of the first user, and requests issue of user information;
the each user information issuing center b authenticates the first user, generates a random number rb, keeps it secret, calculates a power ub of g with the random number rb used as exponent in connection with the field F, notifies the rest of the user information issuing centers of the power ub; the user information issuing center calculates a product u of ub and the public key of the first user in connection with the field F, inputs the result u and the identification information of the first user into the public function h, calculates a sum vb of the random number rb and a product of the output value of the public function h and the secret key Sb of the user information issuing center with the exponent t used as modulus, and notifies the rest of the user information issuing centers of the power sum vb; and wherein the each user information issuing center in cooperation with the rest of the user information issuing centers calculates a sum v of the every vb with the exponent t used as modulus, and issues, to the first user, the product u and sum v, as the first user's first user information and second user information, respectively; and a public key generation step, wherein the first user sends to the second user the first user information u and the second user information v of the first user and the identification information of the first user; the second user inputs the result u and the identification information of the first user into the public function h, calculates a product of the first user information u and a power of the public keys P of all other user information issuing centers with the output value of the public function h used as exponent in connection with the field F, and sets a product of the product and the inverse number of the power of the positive integer g with the second user information v used as exponent, as the public key of the first user.

21. A public key generation method having a first user bearing unique identification information, a second user bearing unique identification information, a plurality of user information issuing centers, and a network which interconnects these, wherein the user information issuing centers cooperate together to set up both a public one-way function f and a public function h, the public key generation method comprising:

a system setup step, wherein n is assumed to be a composite number, and a positive integer g, which is equal to or smaller than $(n-1)$, where both the positive integer g and the composite number n are prime with each other, and which is unequal to 1 until it is raised to a q-th power, where the positive integer q is a divisor of the Euler's function value of n with n as modulus, is used to make the public one way function f a power operation with n as modulus, represented by the following equation:

$$f(a) = g^a \bmod n$$

where the following equations hold:

$$f(a \times b \times \ldots \times z) = g^{a \times b \times \ldots \times z} \bmod n = ((\ldots (g^a)^b \ldots)^z \bmod n = ((\ldots f(a)^b) \ldots)^z$$

$$f(a+b+\ldots+z) = g^{a+b+\ldots+z} \bmod n = g^a \times g^b \times \ldots \times g^z \bmod n = f(a) \times f(b) \times \ldots \times f(z)$$

and the each user information issuing center, in cooperation with the rest of the user information issuing centers, sets up the composite number n, the positive integer g and the public function h; the each user information issuing center b independently sets up a secret key Sb, keeps it in secret, calculates a power value Pb of the positive integer g with the composite number n used as modulus and the secret key Sb as exponent, and notifies the rest of the user information issuing centers of the value Pb;

the each user information issuing center in cooperation with the rest of the user information issuing centers calculates a product P of every Pb with the composite number n used as modulus, as the public key of all the user information issuing centers, and notifies the first and second users of the composite number n, the divisor q, the positive integer g, the public function h, and the public key P as the public information of all the user information issuing centers;

a user information issuing step, wherein the first user sets up a secret key, keeps it in secret, calculates as the public key of the first user a power value of the positive integer g with the composite number n used as modulus and the secret key as exponent, notifies the each user information issuing center of the public key and the identification information of the first user, and requests issue of the user information of the first user;

the user information issuing center b authenticates the first user, generates a random number rb, keeps it in secret, calculates a power value ub of the positive integer g with the composite number n user as modulus and the random number rb as exponent, notifies the rest of the user information issuing centers of the value ub;

the each user information issuing center calculates a product u of the public key of the first user and the each value ub with the composite number n used as modulus, inputs the result u and the identification information the first user into the public function h, calculates a sum vb of the random number rb and a product of the output value of the public function h and the secret key Sb of the each user information issuing center with the divisor q used as modulus, and notifies the rest of the user information issuing centers of the sum vb; and wherein the each user information issuing center in cooperation with the rest of the user information issuing centers calculates a sum v of the every vb with the divisor q used as modulus, and issues to the first user, the product u and sum v, as the first user's first user information and second user information, respectively; and a public key generation step, wherein the first user sends to the second user the first user information u, the second user information v, and the identification information of the first user; and wherein the second user inputs the result u and the identification information of the first user into the public function h, calculates an output value of the public function h with the divisor q used as modulus, calculates a product of a power value of the public key P of all the user information issuing centers and the output value of public function h used as exponent, and the first user information u with the composite number n used as modulus, and sets a product of the product and the inverse number of the power value of the positive integer g with the second user information v used as exponent and the composite number n as modulus, as the public key of the first user.

22. A public key generation method as claimed in claim 21, wherein the divisor q is the common secret information among the user information issuing centers.

23. A public key generation method having a first user bearing unique identification information, a second user bearing unique identification information, a plurality of user information issuing centers, and a network which interconnects these, wherein the user information issuing centers cooperate together to set up both a one-way function f and a function h, the one-way function f being such a function that, when a first operation op1 and a second operation op2 and a third operation op3 and a fourth operation op4 are assumed to be polynomial operations, respectively, and a, b, ..., z are assumed to be data, respectively, following equations:

$$f(op1\ (a, b, \ldots, z)) = op2\ (f(a), b, \ldots, z)$$

$$f(op3\ (a, b, \ldots, z)) = op4\ (f(a), f(b), \ldots, f(z)),$$

the public key generation method comprising:

a system setup step, wherein each user information issuing center b sets up a secret key Sb, keeps it in secret, calculates an output value Pb of the one-way function f taking an input of the secret key Sb, notifies the rest of the user information issuing centers of the output value Pb, sets, in cooperation with the rest of the user information issuing centers, the result P of the fourth operation in response to the output value Pb, as the public key of all the user information issuing centers, and notifies the first user and the second user of the public key P, the one-way function f, and the public function h as the public information of all the user information issuing centers;

a user information issuing step, wherein the first user generates a random number w, keeps it in secret, notifies the each user information issuing center of an output value z of the one-way function f taking an input of the random number w and the identification information of the first user, and requests issue of the user information of the first user;

the each user information issuing center authenticates the first user, generates a random number rb, keeps it in secret, calculates an output value ub of the one-way function f taking an input of the random number rb, and notifies the rest of the user information issuing centers of the output value ub;

the each user information issuing center calculates the result u of the fourth operation taking inputs of both the output value ub and the transmit data z from the first user, inputs the result u and the identification information of the first user into the public function h, calculates the result of the first operation taking inputs of both the secret key Sb of the each user information issuing center and the output value of the function h, calculates the result vb of the third operation taking inputs of both the result of the first operation and the random number rb, and notifies the rest of the user information issuing centers of the result vb;

the each user information issuing center in cooperation with the rest of the user information issuing centers calculates a result v of the third operation in response to the each result vb of the third operation; and issues, to the first user, the result u of the forth operation and the result v of the third operation, as the first user's first user information and second user information, respectively; and wherein the first user calculates the result of the third operation taking inputs of both second user information v and the random number w, and kept it in secret as the secret key x of the first user; and a public key generation step, wherein the first user sends to the second user the first user information u, and the identification information of the first user; and wherein the second user inputs the results u and the identification information of the first user into the public function h, calculates the result of the second operation taking inputs of both the public key P of all the user information issuing centers and the output of the public function h, and sets the result of the fourth operation taking inputs of both the result of the second operation and the first user information u as the public key of the first user.

24. A public key generation method having a first user bearing unique identification information, a second user bearing unique identification information, a plurality of user information issuing centers, and a network which interconnects these, wherein the user information issuing centers cooperate together to set up both a public one-way function f and a public function h, the public key generation method comprising:

a system setup step, wherein when a prime number or a power of the prime number is assumed to be q, a positive integer g, which is one element of a finite field F having q elements and which is unequal to 1 until it is raised to a t-th power, where the exponent t is a divisor of $(q-1)$, is used to make the public one-way function f a power operation of the finite field F, represented by the following equation:

$$f(a) = g^a \text{ (the operation of the finite field } F),$$

where the following equations hold:

$$f(a \times b \times \ldots \times z) \times g^{a \times b \times \ldots \times z} = ((\ldots (g^a)^b) \ldots )^z = ((\ldots f(a)^b) \ldots )^z$$

$$f(a+b+\ldots+z) = g^{a+b\ldots z} = g^a \times g^b \times \ldots \times g^z = f(a) \times f(b) \times \ldots \times f(z)$$

and the each user information issuing center, in cooperation with the rest of the user information issuing centers, sets up the prime number of power of the prime number q, the positive integer g and the public function; the each user information issuing center b respectively sets up a secret key Sb, keeps it in secret, calculates a power Pb of positive integer g with the secret key Sb used as exponent in connection with the field F, and notifies the rest of the user information issuing centers of the output value Pb; the each user information issuing center in cooperation with the rest of the user information issuing centers calculates as the public key of all the user information issuing centers a product P of the every Pb in connection with the field F, and notifies both the first user and the second user of the number q, the positive integer g, the public function h and the public key P, as the public information of all the user information issuing centers;

a user information issuing step, wherein the first user generates a random number w, notifies the each user information issuing center of a power z of the positive integer g with the random number w used as exponent in connection with the field F and the identification information of the first user, and requests the user information of the first user;

each user information issuing center b authenticates the first user, generates a random number rb, keeps it in secret, calculates a power value ub of the positive integer g with the random number rb used as exponent in connection with the field F, notifies the rest of the user information issuing centers of the power value ub;

each user information issuing center calculates a product u of the every power value ub in connection with the field F and the transmit data z from the first user, inputs the result u and the identification information of the first user into the public function h, calculates a sum vb of the random number rb and a product of the output value of the public function had n the secret key Sb of the user information issuing center with the divisor t used as modulus, notifies the rest of the user information issuing centers of the sum vb;

each user information issuing center in cooperation with the rest of the user information issuing centers calculates a sum v of every sum vb in connection with the field F, and issues, to the first user, the product u and sum v, as first user information and second user information of the first user, respectively; and wherein first user calculates the divisor t from the number q, calculates a sum of the random number w and the second user information v with the divisor t used as modulus, and sets the sum as the secret key of the first user; and a public key generation step, wherein the first user sends to the second user the first user information u and the identification information of the first user; and wherein the second user inputs the result u and the identification information of the first user into the public function h, sets a product of the first user information u and the power of the pubic key P of the user information issuing center with the output value of the public function h used as exponent in connection with the field F, as the public key of the first user.

25. A public key generation method having a first user bearing unique identification information, a second user bearing unique identification information, a plurality of user information issuing centers, and a network which interconnects these, wherein the user information issuing centers cooperate together to set up both a public one-way function f and a public function h, the public key generation method comprising:

a system setup step, wherein n is assumed to be a composite number, and a positive integer g, which is equal to or smaller than (n−1), where both the positive integer g and the composite number n are prime with each other, and which is unequal to 1 until it is raised to a q-th power, where the positive integer q is a divisor of the Euler's function value of n with n as modulus, is used to make the public one way function f a power operation with n as modulus, represented by the following equation:

$f(a) = g^a \mod n$ where the following equations hold:

$f(a \times b \times \ldots \times z) \times g^{a \times b \times \ldots \times z} \mod n = ((\ldots (g^a)^b \ldots )^z \mod n = ((\ldots f(a)^b) \ldots )^z$ $f(a+b+\ldots+z) = g^{a+b+\ldots+z} \mod n = g^a \times g^b \times \ldots \times g^z \mod n = f(a) \times f(b) \times \ldots \times f(z)$ and the each user information issuing center, in cooperation with the rest of the user information issuing centers, sets up the composite number n, the positive integer g and the public function h; the each user information issuing center independently sets up a secret key Sb, keeps it in secret, calculates a power value Pb of the positive integer g with the composite number n used as modulus and the secret key Sb as exponent, and notifies the rest of the user information issuing centers of the power value Pb; the each user information issuing center in cooperation with the rest of the user information issuing centers calculates a product P of every power Pb with the composite number n used as modulus, as the public key of all the user information issuing centers, and notifies the first and the second users of the composite number n, the divisor q, the positive integer g, the public function h, and the public key P as the public information of all the user information issuing contest;

a user information issuing step, wherein the first user generates a random number w, notifies the each user information issuing center of a power value z of the positive integer g with the random number w used as exponent and the composite number n used as modulus and the user identification information of the first user, and requests issue of user information of the first user; the each user information issuing center b authenticates the first user, generates a random number rb, keeps it in secret, calculates a power value ub of the positive integer g with the composite number n used as modulus and the random number rb as exponent, and notifies the rest of the user information issuing centers of the power value ub;

each user information issuing center calculates a product u of the every power ub and the transmit data z from the first user with the composite number n used as modulus, inputs the results u and the identification information of the first user into the public function h, calculates a sum vb of the random number rb and a product of the output value of the public function h and the secret key Sb of the user information issuing center with the divisor q used as modulus, notifies the rest of the user information issuing centers of the sum vb;

each user information issuing center in cooperation with the rest of the user information issuing centers calculates a sum v of every sum vb with the divisor q used as modulus, and issues, to the first user, the product u and the sum v, as the first user's first user information and second user information, respectively; and wherein first user calculates a sum of the random number w and the second user information v with the divisor q used as modulus, and sets the sum as the secret key of the first user; and a public key generation step, wherein the first user sends to the second user the first user information u and the identification information of the first user; and wherein the second user inputs the results u and the identification information of the first user into the public function h, calculates an output value of the public function h with the divisor q used as modulus, sets a product of a power value of the public key P of all the user information issuing centers with the output value of the public function h used as exponent and the first user information u with the composite number n used as modulus, as the public key of the first user.

26. A public key generation method as claimed in claim 25, wherein the divisor q is the common secret information among the user information issuing centers.

27. A public key generation method as claimed in claim 20, wherein the second user preliminary calculates and keeps the power values of the public key P or the power values of the positive integer g with a plurality of fixed values as exponents in connection with the field F to use said field in the public key generation step.

28. A public key generation method as claimed in claim 24, wherein, the second user preliminary calculates and keeps the power values of the public key P or the power values of the positive integer g with a plurality of fixed values as exponents in connection with the field F to said field in the public key generation step.

29. A public key generation method as claimed in claim 21, wherein, the second user preliminary calculates and stores the power values of the public key P of the user information issuing center or the power values of the positive integer g with a plurality of fixed values as exponents and with the composite number n as modulus to use the stored results in the public key generation step.

30. A public key generation method as claimed in claim 22, wherein, the second user preliminary calculates and stores the power values of the public key P of the user information issuing center or the power values of the positive integer g with a plurality of fixed values as exponents and with the composite number n as modulus to use the stored results in the public key generation step.

31. A public key generation method as claimed in claim 25, wherein, the second user preliminary calculates and stores the power values of the public key P of the user information issuing center or the power values of the positive integer g with a plurality of fixed values as exponents and with the composite number n as modulus to use the stored results in the public key generation step.

32. A public key generation method as claimed in claim 26, wherein, the second user preliminary calculates and stores the power values of the public key P of the user information issuing center or the power values of the positive integer g with a plurality of fixed values as exponents and with the composite number n as modulus to use the stored results in the public key generation step.

33. A public key generation method as claimed in claim 20, wherein:
   in the system setup step, the each user information issuing center b sets a plurality of secret keys of the user information issuing center, keeps them in secret, and notifies the rest of the user information issuing centers of, as a plurality of public keys of the each user information issuing center, a plurality of powers of the positive integer g with the plurality of secret keys of the user information issuing center used as exponents in connection with the field F; each user information issuing center in cooperation with the rest of the user information issuing centers selects, among the plurality of public keys of each user information issuing center, a set of corresponding values, calculates products of these values, and notifies the first and second users of these products as the public keys of all the user information issuing centers;
   in the user information issuing step, the each user information issuing center b selects, among the plurality of secret keys of its own, one or more secret keys which correspond to the output values of the public function h, calculates, as a second user information, a sum v of these secret keys, and the random number rb with the divisor t used as modulus; and
   in the public key generation step, the second user selects, among the plurality of public keys of all the user information issuing centers, one or more public keys which correspond to the output values of the public function h, and calculates a product of these public keys in connection with the field F.

34. A public key generation method as claimed in claim 24, wherein:
   in the system setup step, the each user information issuing center b sets a plurality of secret keys of the user information issuing center, keeps them in secret, and notifies the rest of the user information issuing centers of, as a plurality of public keys of the each user information issuing center, a plurality of powers of the positive integer g with the plurality of secret keys of the user information issuing center used as exponents in connection with the field F; each user information issuing center in cooperation with the rest of the user information issuing centers selects, among the plurality of public keys of each user information issuing center, a set of corresponding values, calculates products of these values, and notifies the first and second users of these products as the public keys of all the user information issuing centers;
   in the user information issuing step, the each user information issuing center b selects, among the plurality of secret keys of its own, one or more secret keys which correspond to the output values of the public function h, calculates, as a second user information a sum v of these secret keys, and the random number rb with the divisor t used as modulus; and
   in the public key generation step, the second user selects, among the plurality of public keys of all the user information issuing centers, one or more public keys which correspond to the output values of the public function h, and calculates a product of these public keys in connection with the field F.

35. A public key generation method as claimed in claim 24, wherein:
   in the system setup step, the each user information issuing center b sets up a plurality of secret keys of the user information issuing center, keeps them in secret, sets the power values of the positive integer g with the secret keys used as exponents and the composite number n used as modulus, as a plurality of public keys of the user information issuing center b, and each user information issuing center, in cooperation with the rest of the user information issuing centers, selects, among the plurality of public keys of each user information issuing center, a set of corresponding values, calculates products of these values, and notifies the first and second users of these products as the public keys of all the user information issuing centers,
   in the user information issuing step, the each user information issuing center b selects, among the plurality of secret keys of its own, one or more secret keys which correspond to the output values of the public function h, calculates, as second user information, a sum vb of a sum of the one or more secret keys and the random number rb with the divisor q used as modulus, and
   in the public key generation step, the second user selects, among the plurality of public keys of the user information issuing center, one or more public keys which correspond to the output values of the public function h, and calculates a product of these public keys with the composite number n used as modulus.

36. A public key generation method as claimed in claim 27, wherein:

in the system setup step, the each user information issuing center b sets up a plurality of secret keys of the user information issuing center, keeps them in secret, sets the power values of the positive integer g with the secret keys used as exponents and the composite number n used as modulus, as a plurality of public keys of the user information issuing center b, and each user information issuing center, in cooperation with the rest of the user information issuing centers, selects, among the plurality of public keys of each user information issuing center, a set of corresponding values, calculates products of these values, and notifies the first and second users of these products as the public keys of all the user information issuing centers, in the user information issuing step, the each user information issuing center b selects, among the plurality of secret keys of its own, one or more secret keys which correspond to the output values of the public function h, calculates, as second user information, a sum vb of a sum of the one or more secret keys and the random number rb with the divisor q used as modulus, and in the public key generation step, the second user selects, among the plurality of public keys of the user information issuing center, one or more public keys which correspond to the output values of the public function h, and calculates a product of these public keys with the composite number n used as modulus.

37. A public key generation method as claimed in claim 25, wherein:

in the system setup step, the each user information issuing center b sets up a plurality of secret keys of the user information issuing center, keeps them in secret, sets the power values of the positive integer g with the secret keys used as exponents and the composite number n used as modulus, as a plurality of public keys of the user information issuing center b, and each user information issuing center, in cooperation with the rest of the user information issuing centers, selects, among the plurality of public keys of each user information issuing center, a set of corresponding values, calculates products of these values, and notifies the first and second users of these products as the public keys of all the user information issuing centers, in the user information issuing step, the each user information issuing center b selects, among the plurality of secret keys of its own, one or more secret keys which correspond to the output values of the public function h, calculates, as second user information, a sum vb of a sum of the one or more secret keys and the random number rb with the divisor q used as modulus, and in the public key generation step, the second user selects, among the plurality of public keys of the user information issuing center, one or more public keys which correspond to the output values of the public function h, and calculates a product of these public keys with the composite number n used as modulus.

38. A public key generation method as claimed in claim 26, wherein:

in the system setup step, the each user information issuing center b sets up a plurality of secret keys of the user information issuing center, keeps them in secret, sets the power values of the positive integer g with the secret keys used as exponents and the composite number n used as modulus, as a plurality of public keys of the user information issuing center b, and each user information issuing center, in cooperation with the rest of the user information issuing centers, selects, among the plurality of public keys of each user information issuing center, a set of corresponding values, calculates products of these values, and notifies the first and second users of these products as the public keys of all the user information issuing centers, in the user information issuing step, the each user information issuing center b selects, among the plurality of secret keys of its own, on or more secret keys which correspond to the output values of the public function, calculates, as second user information, a sum vb of a sum of the one or more secret keys and the random number rb with the divisor q used as modulus, and in the public key generation step, the second user selects, among the plurality of public keys of the user information issuing center, one or more public keys which correspond to the output values of the public function h, and calculates a product of these public keys with the composite number n used as modulus.

39. A public key generation method as claimed in claim 3, wherein the composite number n is a product of two prime numbers p1 and p2, and the divisor q is a common divisor of both (p1−1) and (p2−1).

40. A public key generation method as claimed in claim 4, wherein the composite number is a product of two prime numbers p1 and p2, and the divisor q is a common divisor of both (p1−1) and (p2−1).

41. A public key generation method as claimed in claim 7, wherein the composite number n is a product of two prime numbers p1 and p2, and the divisor q is a common divisor of both (p1−1) and (p2−1).

42. A public key generation method as claimed in claim 8, wherein the composite number n is a product of two prime numbers p1 and p2, and the divisor q is a common divisor of both (p1−1) and (p2−1).

43. A public key generation method as claimed in claim 21, of the composite number n is a product of two prime numbers p1 and p2, and the divisor q is a common divisor of both (p1−1) and (p2−1).

44. A public key generation method as claimed in claim 25, wherein the composite number n is a product of two prime numbers p1 and p2, and the divisor q is a common divisor of both (p1−1) and (p2−1).

45. A public key generation method as claimed in claim 3, wherein the composite number n is a product of two prime numbers p1 and p2, and the divisor q is the least common multiple of both (p1−1) and (p2−1).

46. A public key generation method as claimed in claim 4, wherein the composite number n is a product of two prime numbers p1 and p2, and the divisor q is the least common multiple of both (p1−1) and (p2−1).

47. A public key generation method as claimed in claim 7, wherein the composite number n is a product of two prime numbers p1 and p2, and the divisor q is the least common multiple of both (p1−1) and (p2−1).

48. A public key generation method as claimed in claim 8, wherein the composite number n is a product of two prime numbers p1 and p2, and the divisor q is the least common multiple of both (p1−1) and (p2−1).

49. A public key generation method as claimed in claim 21, wherein the composite number n is a product of two prime numbers p1 and p2, and the divisor q is the least common multiple of both (p1−1) and (p2−1).

50. A public key generation method as claimed in claim 21, wherein the composite number n is a product of two prime numbers p1 and p2, and the divisor q is the least common multiple of both (p1−1) and (p2−1).

* * * * *